United States Patent
Sone

(10) Patent No.: US 9,663,140 B2
(45) Date of Patent: May 30, 2017

(54) ELECTRIC POWER STEERING SYSTEM FOR VEHICLE

(71) Applicant: TOYOTA JIDOSHA KABUSHIKI KAISHA, Toyota-shi, Aichi-ken (JP)

(72) Inventor: Atsushi Sone, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 14/961,100

(22) Filed: Dec. 7, 2015

(65) Prior Publication Data
US 2016/0167701 A1  Jun. 16, 2016

(30) Foreign Application Priority Data

Dec. 16, 2014  (JP) .................................. 2014-253575

(51) Int. Cl.
| | | |
|---|---|---|
| *B62D 5/04* | (2006.01) | |
| *G01D 5/244* | (2006.01) | |
| *G01L 3/12* | (2006.01) | |

(52) U.S. Cl.
CPC ........... *B62D 5/0463* (2013.01); *B62D 5/049* (2013.01); *G01D 5/244* (2013.01); *G01L 3/12* (2013.01)

(58) Field of Classification Search
CPC ............. B62D 5/04; G01D 5/244; G01L 3/12
USPC ................. 701/41, 43; 73/862.193, 862.331; 180/446
See application file for complete search history.

(56) References Cited

U.S. PATENT DOCUMENTS

| | | | | |
|---|---|---|---|---|
| 2006/0042403 | A1* | 3/2006 | Oike | B62D 6/10 73/862.331 |
| 2012/0116717 | A1* | 5/2012 | Satou | G01D 5/24457 702/151 |
| 2013/0145865 | A1* | 6/2013 | Aoki | G01L 3/10 73/862.193 |
| 2014/0336878 | A1* | 11/2014 | Yanai | G01D 5/145 701/41 |
| 2016/0111988 | A1* | 4/2016 | Suzuki | H02P 29/0241 180/446 |

(Continued)

FOREIGN PATENT DOCUMENTS

| | | |
|---|---|---|
| JP | 2005-077304 A | 3/2005 |
| JP | 2012-098231 A | 5/2012 |

(Continued)

*Primary Examiner* — Thomas G Black
*Assistant Examiner* — Wae Louie
(74) *Attorney, Agent, or Firm* — Oliff PLC

(57) ABSTRACT

An electric power steering system includes a motor, rotation angle sensors, a determination unit, and a control unit. The determination unit determines whether each rotation angle sensor has a failure by one of determination methods depending on whether a situation is a first situation where one of the rotation angle sensors has a failure or a second situation where the rotation angle sensors have no failures. In the first situation, the control unit continues to control driving of the motor based on a rotation angle of the motor detected by a remaining rotation angle sensor having no failure. Only when determining, in the first situation, whether there is a failure in the remaining rotation angle sensor, the determination unit determines whether there is a failure based on whether a steering torque exhibits a specific behavior assumed to be detected when there is a failure in the remaining rotation angle sensor.

9 Claims, 18 Drawing Sheets

(56) References Cited

U.S. PATENT DOCUMENTS

| | | | | |
|---|---|---|---|---|
| 2016/0159389 A1* | 6/2016 | Kuramitsu | ............ | B62D 5/0484 180/446 |
| 2016/0167701 A1* | 6/2016 | Sone | ...................... | B62D 5/049 701/43 |
| 2016/0200355 A1* | 7/2016 | Mori | .................... | B62D 5/0484 180/446 |
| 2016/0231142 A1* | 8/2016 | Kawano | ............. | G01D 5/24485 |
| 2016/0304119 A1* | 10/2016 | Sugawara | ............... | H02P 21/05 |
| 2016/0311462 A1* | 10/2016 | Inada | ................... | B62D 5/0406 |
| 2016/0339949 A1* | 11/2016 | Mori | ................... | B62D 5/0484 |

FOREIGN PATENT DOCUMENTS

| | | |
|---|---|---|
| JP | 2012-166776 A | 9/2012 |
| JP | 2013-088154 A | 5/2013 |
| WO | 2013/076839 A1 | 5/2013 |

* cited by examiner

F I G . 1
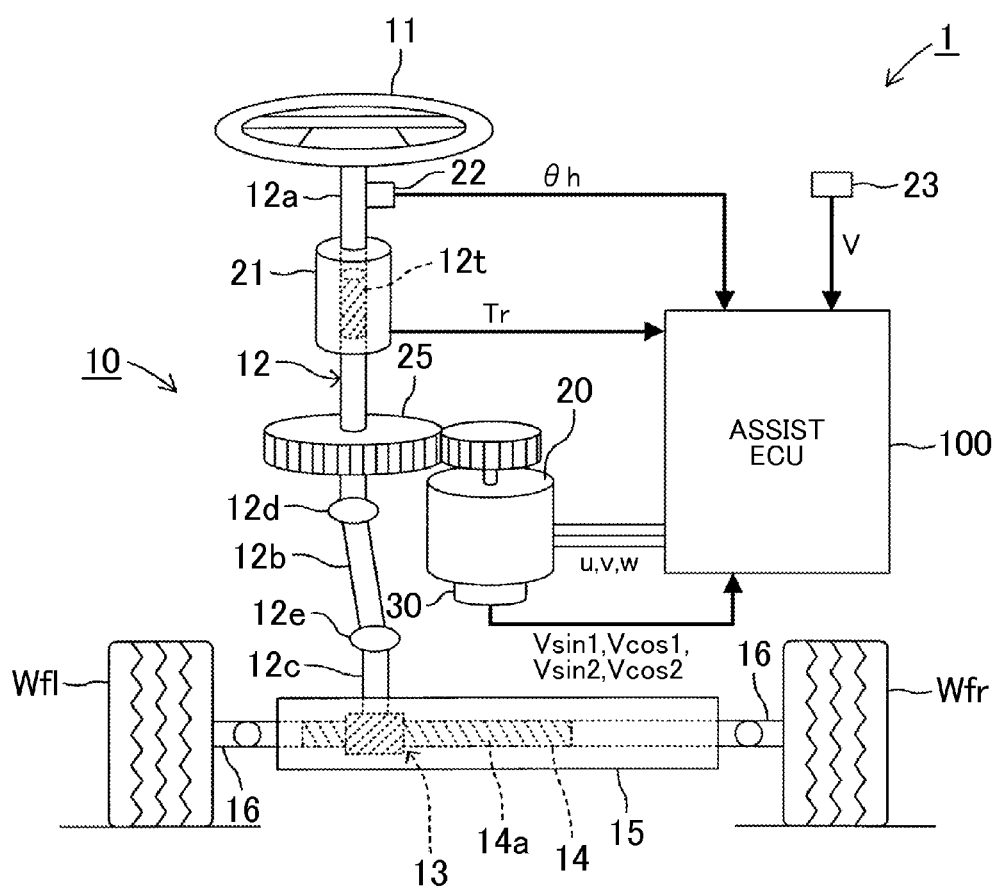

F I G . 3
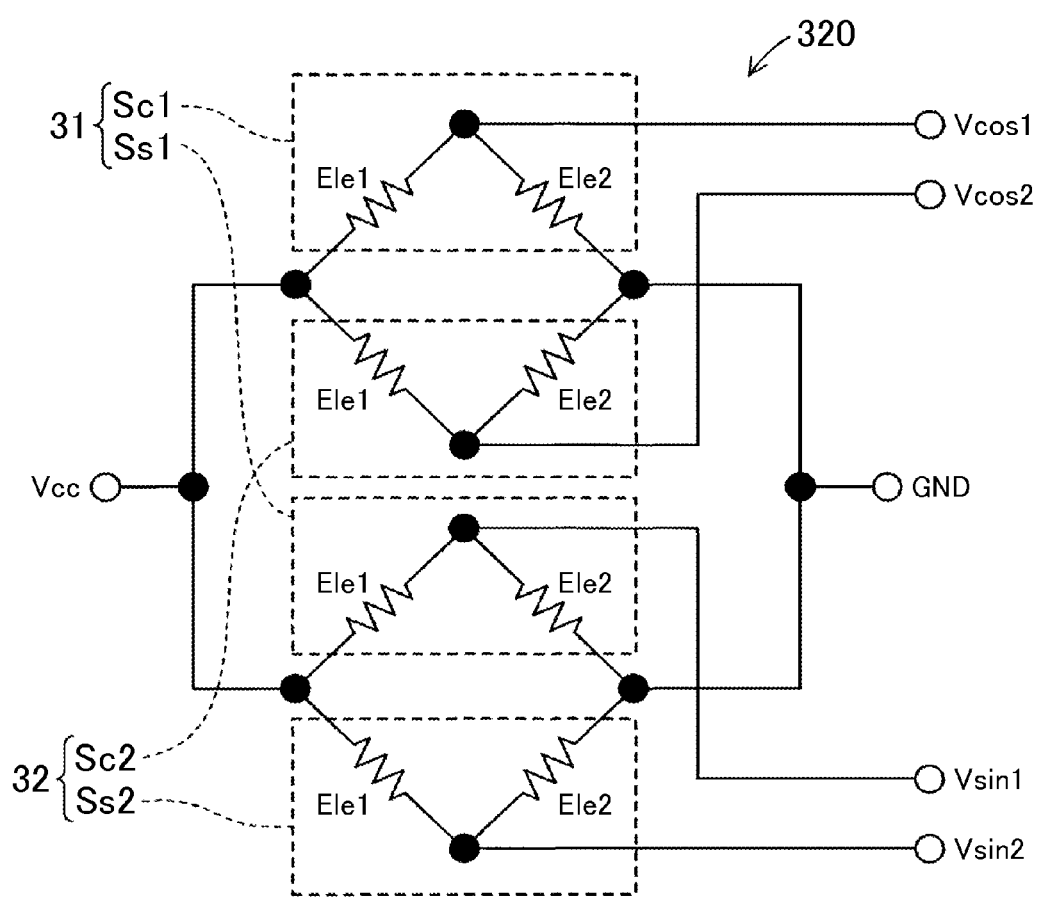

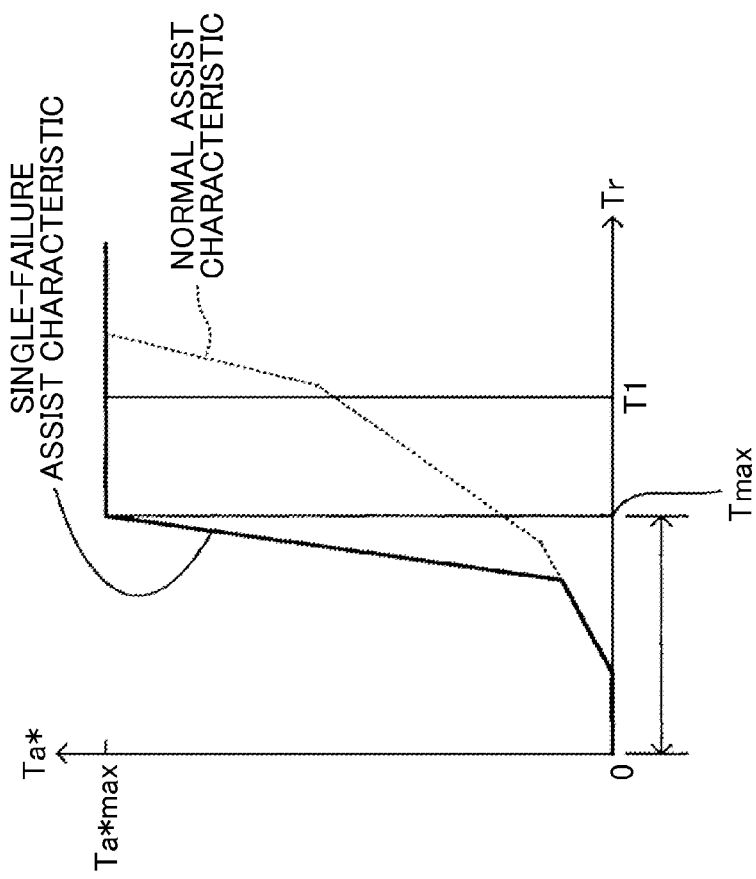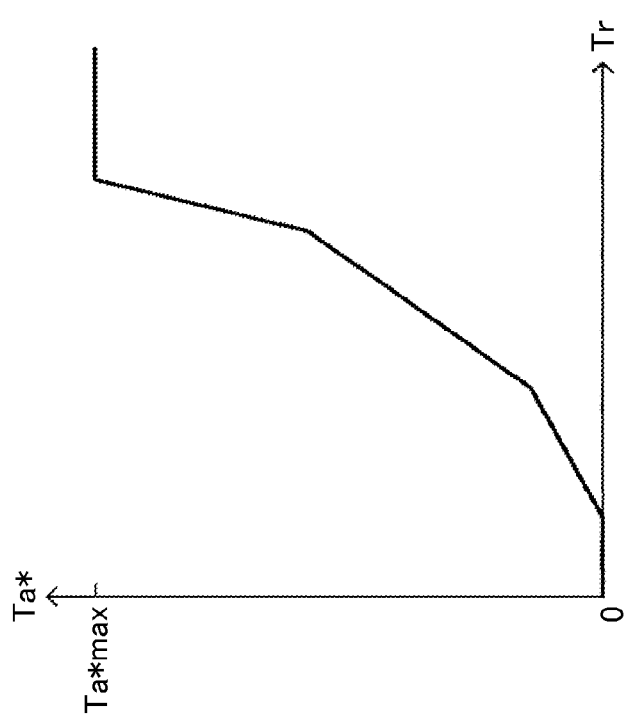
FIG. 5A
FIG. 5B

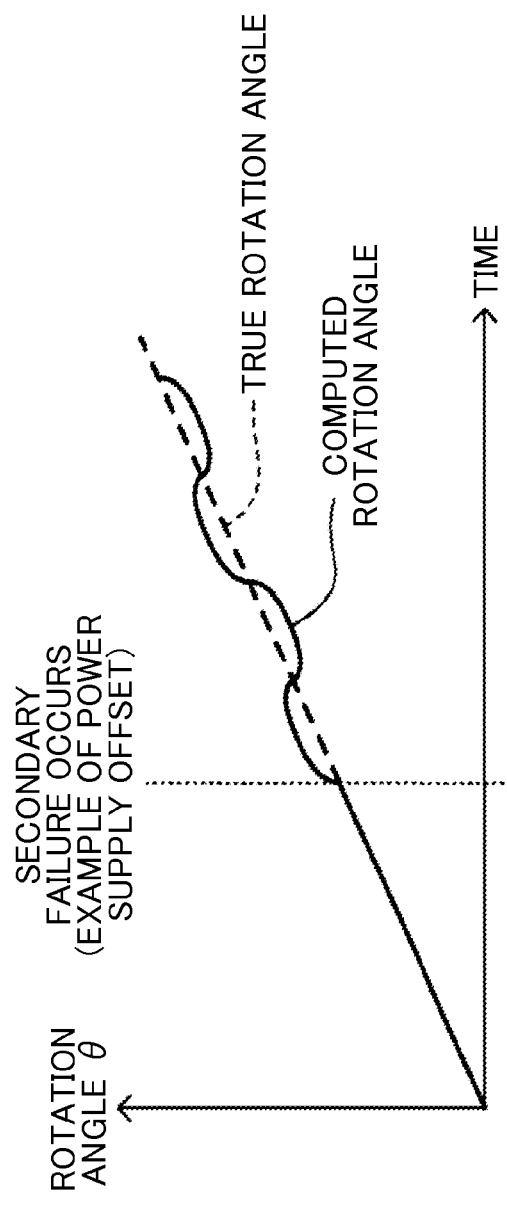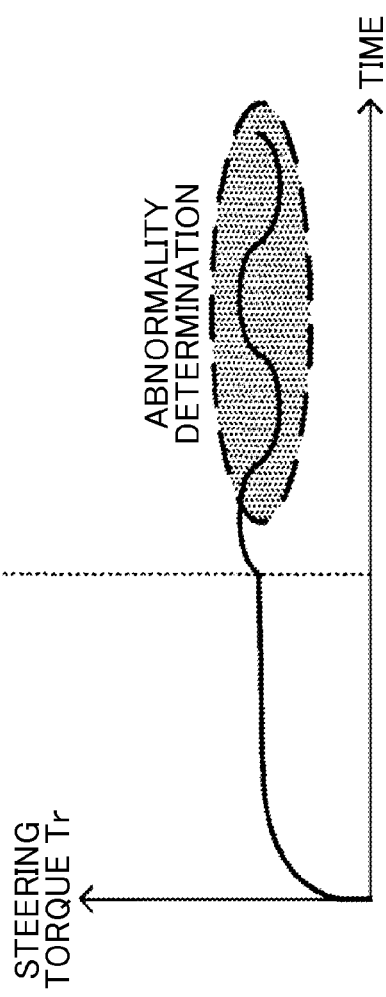
F I G . 12A
F I G . 12B

US 9,663,140 B2

ELECTRIC POWER STEERING SYSTEM FOR VEHICLE

INCORPORATION BY REFERENCE

The disclosure of Japanese Patent Application No. 2014-253575 filed on Dec. 16, 2014 including the specification, drawings and abstract is incorporated herein by reference in its entirety.

BACKGROUND OF THE INVENTION

1. Field of the Invention

The invention relates to an electric power steering system for a vehicle, which generates steering assist torque by driving a motor on the basis of a driver's steering operation.

2. Description of Related Art

Conventionally, an electric power steering system uses a torque sensor to detect a steering torque input to a steering wheel by a driver, and calculates a target steering assist torque on the basis of the detected steering torque. A driver's steering operation is assisted by controlling a current flowing through a motor such that the target steering assist torque is obtained.

A motor that requires a rotation angle sensor may be used as the motor of the electric power steering system. For example, when a brushless motor, such as a three-phase permanent magnet motor, is used, it is necessary to detect a motor electrical angle with the use of a rotation angle sensor and control the phases of three phase voltages.

When the rotation angle sensor fails, it is not possible to control the phases of the motor. Therefore, there is also known an electric power steering system including two rotation angle sensors as suggested in, for example, Japanese Patent Application Publication No. 2012-98231 (JP 2012-98231 A).

When two rotation angle sensors are provided, it is possible to determine there is a failure in any one of the rotation angle sensors when two detected signals of the rotation angle sensors deviate from each other as a result of a comparison between the two detected signals. However, it may not be possible to accurately detect a failure of one of the rotation angle sensors after a failure of the other one of the rotation angle sensors has been detected. This is because it is not possible to compare detected signals of the rotation angle sensors with each other.

For example, when the magnitude of a detected signal (for example, voltage signal) of any one of the rotation angle sensors falls outside an assumed range, it is possible to detect a failure of the any one of the rotation angle sensors solely. However, for such a failure that the magnitude of a detected signal is fixed to an intermediate value within the assumed range (a failure due to a short circuit of a signal line, or the like), it is not possible to determine whether the detected value is fixed because of a failure or the steering wheel is locked. Therefore, it is not possible to properly monitor the rotation angle sensor, in which no failure has been detected, for a failure. In consideration of the fact that it is difficult to accurately determine whether there is a failure in the rotation angle sensor in which no failure has been detected when a failure of one of the rotation angle sensors has been detected, it is necessary to stop steering assist control even when the rotation angle sensor in which no failure has been detected is actually normal.

Therefore, even when the accuracy of detecting a failure of one of rotation angle sensors is improved by providing the two rotation angle sensors, it may not be possible to effectively utilize the other rotation angle sensor, in which no failure has been detected, after a failure of the one of the rotation angle sensors has been detected.

SUMMARY OF THE INVENTION

The invention provides an electric power steering system for a vehicle, which, even when a failure of one of two rotation angle sensors has been detected, is able to properly continue steering assist with the use of the other rotation angle sensor in which no failure has been detected while properly monitoring the other rotation angle sensor.

An aspect of the invention is an electric power steering system for a vehicle. The electric power steering system includes a torque detection unit, a motor, a rotation angle detection unit, a motor control value computing unit, a motor control unit, and a sensor failure determination unit. The torque detection unit is configured to detect a steering torque input from a steering wheel to a steering shaft. The motor is provided in a steering mechanism and is configured to generate a steering assist torque. The rotation angle detection unit includes a first rotation angle sensor and a second rotation angle sensor, and is configured to detect a rotation angle of the motor with an output signal of at least one of the first rotation angle sensor and the second rotation angle sensor. The motor control value computing unit is configured to compute a motor control value for generating a target steering assist torque based on the steering torque detected by the torque detection unit. The motor control unit is configured to control driving of the motor based on the rotation angle detected by the rotation angle detection unit and the motor control value computed by the motor control value computing unit. The sensor failure determination unit is configured to determine whether there is a failure in the first rotation angle sensor and the second rotation angle sensor by one of mutually different failure determination methods depending on whether a situation is a first situation or a second situation. The first situation is a situation in which a failure of one of the first rotation angle sensor and the second rotation angle sensor has been already detected. The second situation is a situation in which neither a failure of the first rotation angle sensor nor a failure of the second rotation angle sensor has been detected. The motor control unit is configured to, in the first situation, continue to control driving of the motor based on the rotation angle detected by a remaining rotation angle sensor in which no failure has been detected. The remaining rotation angle sensor is the first rotation angle sensor or the second rotation angle sensor. The sensor failure determination unit is configured to, only when determining, in the first situation, whether there is a failure in the remaining rotation angle sensor, determine whether there is a failure based on whether the steering torque detected by the torque detection unit exhibits a specific behavior assumed to be detected when there is a failure in the remaining rotation angle sensor.

In the aspect of the invention, the motor control unit controls driving of the motor on the basis of the rotation angle of the motor, detected by the rotation angle detection unit, and the motor control value computed by the motor control value computing unit. Thus, the steering assist torque commensurate with a steering operation is applied to the steering mechanism to assist a driver's steering operation.

In the aspect of the invention, the rotation angle detection unit just needs to be able to detect the rotation angle of a rotor of the motor. The rotation angle detection unit may be configured to not only directly detect the rotation angle of the rotor but also detect the rotation angle of a member that rotates together with rotation of the rotor.

In the aspect of the invention, when the motor control unit is controlling driving of the motor on the basis of the rotation angle detected by the rotation angle sensor in which no failure has been detected, i.e., by the remaining rotation angle sensor, and when there occurs a failure in that rotation angle sensor, there occurs a specific change in the steering torque detected by the torque detection unit. Only when it is determined whether there is a failure in the rotation angle sensor in which no failure has been detected in the situation that only a failure of one of the first rotation angle sensor and the second rotation angle sensor has been detected, the sensor failure determination unit determines whether there is a failure on the basis of whether the steering torque detected by the torque detection unit exhibits a specific behavior that is assumed in the case where there is a failure in the rotation angle sensor in which no failure has been detected.

Thus, even when there is a failure in the rotation angle sensor in which no failure has been detected and the failure cannot be determined only by using the detected signal of the rotation angle sensor, but when the steering torque exhibits the specific behavior that is assumed in the case where there is a failure in the rotation angle sensor in which no failure has been detected, it is possible to determine that there is a failure in the rotation angle sensor that is used in motor control (the rotation angle sensor in which no failure has been detected).

Therefore, according to the aspect of the invention, even when a failure of one of the two rotation angle sensors (the first rotation angle sensor and the second rotation angle sensor) has been detected, it is possible to continue steering assist with the use of the rotation angle sensor in which no failure has been detected while properly monitoring that rotation angle sensor. Because it is determined whether there is a failure on the basis of the behavior of the steering torque only when it is determined whether there is a failure in the rotation angle sensor in which no failure has been detected, it is possible to reduce the possibility of erroneous failure determination in the situation that both the first rotation angle sensor and the second rotation angle sensor are normal.

In the above aspect of the invention, the specific behavior may include a behavior that a duration of a state where the steering torque is larger than or equal to a preset failure determination value is longer than or equal to a set time.

For example, when there is a failure (signal fixation failure) that the detected signal of the rotation angle sensor in which no failure has been detected is fixed to a constant value, the motor rotation angle to be detected does not advance, so a torque that is generated by the motor becomes insufficient. As a result, a force that is input to the steering wheel by a driver, that is, a steering torque that is detected by the torque detection unit, steeply increases. Focusing on such a feature during a failure, in the above-described configuration, when the duration of the state where the steering torque is larger than or equal to the preset failure determination value is longer than or equal to the set time, it is determined that there is a failure in the rotation angle sensor in which no failure has been detected. Therefore, when there is a signal fixation failure, it is possible to properly perform failure determination.

In the above configuration, the electric power steering system may further include a first determination value setting unit configured to set the failure determination value larger when a speed of the vehicle is relatively low than when the speed of the vehicle is relatively high.

When there is no failure in the rotation angle sensor in which no failure has been detected, and when the steering torque becomes larger than or equal to the failure determination value, there is a high possibility of erroneously determination that there is a failure in the rotation angle sensor in which no failure has been detected. On the other hand, during dry steering or during steering while traveling at an extremely low speed, there is a high possibility that the steering torque becomes larger than or equal to the failure determination value because the steering torque tends to increase. In the above configuration, the first determination value setting unit sets the failure determination value such that the failure determination value in the case where the speed of the vehicle is low is larger than the failure determination value in the case where the speed of the vehicle is high. Therefore, with the above configuration, it is possible to reduce erroneous determination (erroneous determination that there is a failure in a sensor that has no failure) in failure detection while keeping the accuracy of detecting a failure in the rotation angle sensor in which no failure has been detected.

In the above configuration, the electric power steering system may further include a second determination value setting unit configured to set the failure determination value larger when the motor control unit is operating in an output limitation mode in which an output of the motor is limited than when the motor control unit is not operating in the output limitation mode.

Generally, an electric power steering system has the function of limiting the output of a motor for the purpose of, for example, preventing overheating of the motor. When the motor control unit is operating in the output limitation mode in which the output of the motor is limited, the steering assist torque is limited as compared to a normal mode (a mode in which the motor control unit is not operating in the output limitation mode). Therefore, a force that is input to the steering wheel by a driver, that is, a steering torque that is detected by the torque detection unit, tends to increase.

In the above configuration, the second determination value setting unit sets the failure determination value such that the failure determination value in the case where the motor control unit is operating in the output limitation mode in which the output of the motor is limited is larger than the failure determination value in the case where the motor control unit is not operating in the output limitation mode. Therefore, with the above configuration, it is possible to reduce erroneous determination in failure detection while keeping the accuracy of detecting a failure in the rotation angle sensor in which no failure has been detected.

In the above configuration, the electric power steering system may further include a third determination value setting unit configured to set the failure determination value larger when the steering wheel is located within a predetermined range from a steering limit position than when the steering wheel is not located within the predetermined range from the steering limit position.

For example, when the steering wheel is operated for steering by a large amount and then the steering position has reached the steering limit position, the steering wheel cannot be turned any more, and there is a possibility that the steering torque steeply increases.

In the above configuration, the third determination value setting unit sets the failure determination value such that the failure determination value in the case where the steering wheel is located within the predetermined range from the steering limit position is larger than the failure determination value in the case where the steering wheel is not located within the predetermined range from the steering limit position. The fact that the steering wheel is located within the predetermined range from the steering limit position means that the steering wheel is located near the steering limit position. Therefore, with the above configuration, it is possible to reduce erroneous determination in failure detection while keeping the accuracy of detecting a failure in the rotation angle sensor in which no failure has been detected.

In the above configuration, the sensor failure determination unit may be configured to, when the behavior that the duration is longer than or equal to the set time has been detected, add a predetermined rotation angle to a motor rotation angle used by the motor control unit to control driving of the motor. In addition, the sensor failure determination unit may be configured to determine that there is a failure in the remaining rotation angle sensor when there occurs no change in the rotation angle detected by the rotation angle detection unit after adding the predetermined rotation angle to the motor rotation angle.

In the above configuration, even when the behavior that the duration of the state where the steering torque is larger than or equal to the preset failure determination value is longer than or equal to the set time has been detected, it is not immediately finally determined that there is a failure in the rotation angle sensor in which no failure has been detected. On the other hand, in the above configuration, when the behavior that the duration is longer than or equal to the set time has been detected, the predetermined rotation angle is added to the rotation angle (the motor rotation angle) that is used by the motor control unit in order to control driving of the motor. When the predetermined rotation angle is added to the motor rotation angle, the motor control unit changes the electrical angle of the motor by the amount corresponding to the added amount. Accordingly, the steering assist torque that is output from the motor changes, and the steering wheel rotates. At this time, when there is no failure in the rotation angle sensor in which no failure has been detected, the rotation angle detection unit should detect a change in the rotation angle of the motor. In contrast, when there is no change in the rotation angle that is detected by the rotation angle detection unit after adding the predetermined rotation angle, it may be regarded that there is a failure in the rotation angle sensor in which no failure has been detected. By utilizing this, when there is no change in the rotation angle that is detected by the rotation angle detection unit after adding the predetermined rotation angle, the sensor failure determination unit finally determines that there is a failure in the rotation angle sensor in which no failure has been detected. Therefore, with the above configuration, it is possible to reduce erroneous determination in failure detection while keeping the accuracy of detecting a failure in the rotation angle sensor in which no failure has been detected. The predetermined rotation angle is desirably added in a direction in which the steering torque acts; however, the predetermined rotation angle may be added in a direction opposite to the direction in which the steering torque acts.

In the above configuration, the sensor failure determination unit may be configured to determine that there is a failure in the remaining rotation angle sensor when there occurs no change in the rotation angle detected by the rotation angle detection unit after adding the predetermined rotation angle to the motor rotation angle and when a magnitude of an induced voltage generated in the motor is higher than a set voltage for determining that the motor is rotating.

For example, in the situation that the steering wheel cannot be turned (the situation that the steering wheel has reached the steering limit position, the situation that the steered wheels get caught in tracks, or the like), even when the predetermined rotation angle is added to the rotation angle of the motor, the steering wheel is not turned. Therefore, there is a possibility that the rotation angle that is detected by the rotation angle detection unit does not change. On the other hand, when an induced voltage that is generated in the motor is high, it may be estimated that the motor is rotating. By utilizing this, when there is no change in the rotation angle that is detected by the rotation angle detection unit after adding the predetermined rotation angle and the magnitude of the induced voltage that is generated in the motor is higher than the set voltage for determining that the motor is rotating, the sensor failure determination unit finally determines that there is a failure in the rotation angle sensor in which no failure has been detected. Therefore, with the above configuration, it is possible to further reduce erroneous determination in failure detection while keeping the accuracy of detecting a failure in the rotation angle sensor in which no failure has been detected.

In the above aspect of the invention, the motor control value computing unit may be configured to set a magnitude of the target steering assist torque for the steering torque larger when a failure of one of the first rotation angle sensor and the second rotation angle sensor has been detected by the sensor failure determination unit than when neither a failure of the first rotation angle sensor nor a failure of the second rotation angle sensor has been detected.

When there is no failure in the rotation angle sensor in which no failure has been detected, it is necessary to cause the steering torque not to become larger than or equal to the failure determination value as much as possible for the purpose of preventing erroneous determination in failure detection. The motor control value computing unit sets the magnitude of the target steering assist torque for the steering torque such that the magnitude of the target steering assist torque for the steering torque in the case where a failure of one of the first rotation angle sensor and the second rotation angle sensor has been detected is larger than the magnitude of the target steering assist torque for the steering torque in the case where neither a failure of the first rotation angle sensor nor a failure of the second rotation angle sensor has been detected. Thus, when a failure of one of the first rotation angle sensor and the second rotation angle sensor has been detected, the steering operation is light (that is, the steering wheel is allowed to be operated by a driver with a smaller force), so it is possible to make the steering torque difficult to become larger than or equal to the failure determination value. Therefore, with the above configuration, it is possible to reduce erroneous determination in failure detection while keeping the accuracy of detecting a failure in the rotation angle sensor in which no failure has been detected. The magnitude of the target steering assist torque for the steering torque may be increased in all the range of the steering torque. Alternatively, such a relationship may be set in at least part of the range of the steering torque.

In the above aspect of the invention, each of the first rotation angle sensor and the second rotation angle sensor may include two magnetic sensors. In addition, each of the two magnetic sensors may include two serially connected magnetoresistance elements to which voltage is applied from a power supply circuit. In addition, each of the two magnetic sensors may be configured to output a voltage signal at a connection point of the corresponding two magnetoresistance elements, the voltage signals changing in a sinusoidal shape with rotation of the motor and having equal amplitudes with phases shifted by $\pi/2$ from each other. In addition, the specific behavior may include a behavior that the steering torque periodically changes in a preset frequency range.

With the above configuration, in each of the first rotation angle sensor and the second rotation angle sensor, a sinusoidal voltage signal is obtained from the voltage signal of one of the magnetic sensors, and a cosinusoidal voltage signal is obtained from the voltage signal of the other one of the magnetic sensors. Therefore, it is possible to obtain the motor rotation angle by calculating the arctangent of the voltage values (voltage values excluding a direct-current component) of the two signals.

In the above configuration, a value based on the sum of the square of a sinusoidal-voltage-component voltage value (a voltage value excluding a direct-current component from the sinusoidal voltage signal) and the square of a cosinusoidal-voltage-component voltage value (a voltage value excluding a direct-current component from the cosinusoidal voltage signal) (for example, the square root of the sum) is computed, and, when the computed value is not a predetermined value, it may be determined that there is a failure in the rotation angle sensor.

When there is a failure that the power supply voltage of each of the rotation angle sensors (two magnetic sensors) is fixed to an intermediate voltage lower than a normal voltage and the potential at an intermediate point has changed, the origin of the voltage signal that is output from each magnetic sensor deviates. Therefore, in the situation that there is a failure in one of the first rotation angle sensor and the second rotation angle sensor, there is a range of the motor rotation angle, in which a failure cannot be detected by the use of the above-described computed value depending on the motor rotation angle. That is, a value based on the sum of the square of the sinusoidal-voltage-component voltage value and the square of the cosinusoidal-voltage-component voltage value becomes normal in the specific range of the motor rotation angle. Therefore, when quick steering operation is carried out, there is a concern that a failure of the rotation angle sensor is not detected.

On the other hand, when there is such a power supply failure, the steering torque periodically fluctuates while the steering wheel is being operated. Focusing on such a feature during a failure, in the above configuration, when the steering torque periodically changes in the preset frequency range, it is determined that there is a failure in the rotation angle sensor in which no failure has been detected. The preset frequency range is set to the range of the oscillation frequency of the steering torque, which is assumed to be detected when the power supply voltage of the rotation angle sensor in which no failure has been detected is fixed to the intermediate voltage. Therefore, when there is the above-described power supply failure, it is possible to properly determine a failure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a schematic configuration view of an electric power steering system for a vehicle according to an embodiment of the invention;

FIG. 3 is a circuit configuration view of a sensor portion;

FIG. 5A is a graph that show assist map;

FIG. 5B is a graph that show assist map;

FIG. 12A is a graph that shows change in rotation angle in the event of a power supply offset failure;

FIG. 12B is a graph that shows change in steering torque in the event of a power supply offset failure;

DETAILED DESCRIPTION OF EMBODIMENTS

Figure 2:
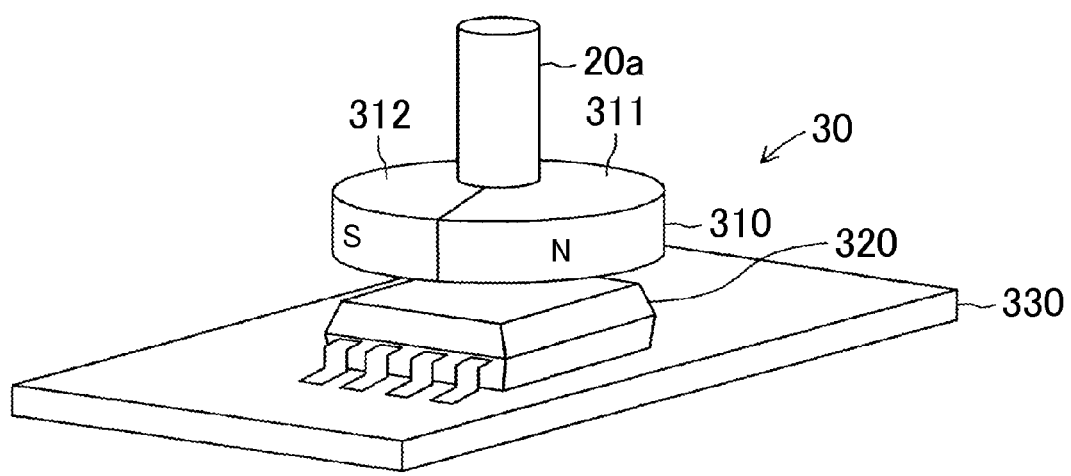
FIG. 2 is a schematic perspective view of a rotation angle sensor unit.

Hereinafter, an electric power steering system for a vehicle according to an embodiment of the invention will be described with reference to the accompanying drawings. FIG. 1 shows the schematic configuration of the electric power steering system 1 for a vehicle according to the embodiment.

The electric power steering system 1 includes a steering mechanism 10, a motor 20 and an electronic control unit 100 as major components. The steering mechanism 10 steers steered wheels as a result of steering operation of a steering wheel 11. The motor 20 is assembled to the steering mechanism 10, and generates steering assist torque. The electronic control unit 100 controls the operation of the motor 20 in response to an operating state of the steering wheel 11. Hereinafter, the electronic control unit 100 is referred to as assist ECU 100.

The steering mechanism 10 converts the rotation of a steering shaft 12 around the axis of the steering shaft 12 to the lateral stroke motion of a rack bar 14 by the use of a rack-and-pinion mechanism 13, and then steers a right front wheel Wfr and a left front wheel Wfl as a result of the stroke motion of the rack bar 14. The rotation of the steering shaft 12 is interlocked with the turning operation of the steering wheel 11. The steering shaft 12 includes a main shaft 12a, a pinion shaft 12c and an intermediate shaft 12b. The steering wheel 11 is coupled to the upper end of the main shaft 12a. The pinion shaft 12c is coupled to the rack-and-pinion mechanism 13. The intermediate shaft 12b couples the main shaft 12a to the pinion shaft 12c via universal joints 12d, 12e.

A gear portion 14a of the rack bar 14 is accommodated in a rack housing 15. Both right and left ends of the rack bar 14 are exposed from the rack housing 15 and are coupled to tie rods 16. The other ends of the right and left tie rods 16 are connected to knuckles (not shown) respectively provided in the right and left front wheels Wfr, Wfl. Hereinafter, the right front wheel Wfr and the left front wheel Wfl are simply referred to as steered wheels W.

A torque sensor 21 and a steering angle sensor 22 are provided in the steering shaft 12 (main shaft 12a). The torque sensor 21 detects a torsional angle of a torsion bar 12t, and detects a steering torque Tr, input from the steering wheel 11 to the steering shaft 12, on the basis of the torsional angle. The torsion bar 12t is interposed in the steering shaft 12 (main shaft 12a). The steering angle sensor 22 detects the rotation angle of the steering wheel 11 as a steering angle θh.

The operating direction of the steering wheel 11 is identified on the basis of the sign of the steering torque Tr. For example, the steering torque Tr at the time of turning the steering wheel 11 leftward is indicated by a positive value, and the steering torque Tr at the time of turning the steering wheel 11 rightward is indicated by a negative value. The steering direction with respect to a neutral position is identified by the sign of the steering angle θh. For example, the leftward steering angle θ is indicated by a positive value, and the rightward steering angle θ is indicated by a negative value. The magnitude of the steering torque T and the magnitude of the steering angle θ are indicated by the absolute value thereof.

The motor 20 is assembled to the steering shaft 12 (main shaft 12a) via a speed reducer 25. For example, a three-phase brushless motor is used as the motor 20. The motor 20 applies assist torque to the turning operation of the steering wheel 11 by driving the steering shaft 12 to rotate around the central axis of the steering shaft 12 via the speed reducer 25 by the use of the rotation of the rotor.

A rotation angle sensor unit 30 is provided in the motor 20. The rotation angle sensor unit 30 detects the rotation angle of the rotor 20a. As shown in FIG. 2, the rotation angle sensor unit 30 includes a magnet portion 310 and a sensor portion 320. The magnet portion 310 is fixedly connected to one end of the rotor 20a of the motor 20. The sensor portion 320 is provided so as to face the magnet portion 310. The sensor portion 320 is provided on a substrate 330. The substrate 330 is fixed such that the relative position of the substrate 330 with respect to the casing (not shown) of the motor 20 does not change. The magnet portion 310 is a disc-shaped magnetic member provided coaxially with the rotor 20a of the motor 20. A half region 311 (semilunar region) of the magnet portion 310 is magnetized to the N pole, and the remaining half region 312 (semilunar region) is magnetized to the S pole.

The sensor portion 320 is spaced a predetermined gap in the axial direction of the rotor 20a of the motor 20 away from the disc-shaped plane of the magnet portion 310. As shown in FIG. 3, the sensor portion 320 includes a first rotation angle sensor 31 and a second rotation angle sensor 32. The first rotation angle sensor 31 includes two magnetic sensors Ss1, Sc1. The second rotation angle sensor 32 includes two magnetic sensors Ss2, Sc2.

In order to detect the rotation angle of the motor 20, only any one of the first rotation angle sensor 31 and the second rotation angle sensor 32 just needs to be provided; however, the first rotation angle sensor 31 and the second rotation angle sensor 32 are provided as a backup in case of a failure of one of the first rotation angle sensor 31 and the second rotation angle sensor 32. Therefore, the rotation angle sensor unit 30 includes the first rotation angle sensor 31 and the second rotation angle sensor 32.

Each of the magnetic sensors Ss1, Sc1, Ss2, Sc2 includes two thin-film ferromagnetic metal elements (magnetoresistance elements) Ele1, Ele2 having such a characteristic that an electrical resistance value changes in response to the strength of a magnetic field in a specific direction. In each of the magnetic sensors Ss1, Sc1, Ss2, Sc2, the two elements Ele1, Ele2 are connected in series with each other, a voltage Vcc is applied between both ends of the pair of serially connected two elements Ele1, Ele2 (the voltage Vcc is applied between the end of the element Ele1, which is one of the pair of serially connected elements, and the end of the element Ele2, which is the other one of the pair of serially connected elements). Each of the magnetic sensors Ss1, Sc1, Ss2, Sc2 outputs a corresponding one of voltage signals V sin 1, V cos 1, V sin 2, V cos 2, each of which indicates a potential at a corresponding connection point (intermediate point) between the two elements Ele1, Ele2. A magnetic sensor that uses magnetoresistance elements is generally called MR sensor, so, hereinafter, the magnetic sensors Ss1, Sc1, Ss2, Sc2 are referred to as MR sensors Ss1, Sc1, Ss2, Sc2.

In this sensor portion 320, a power supply circuit common to the first rotation angle sensor 31 and the second rotation angle sensor 32 is used, one end of each of the MR sensors Ss1, Sc1, Ss2, Sc2 is connected to a common power supply terminal, and the other end of each of the MR sensors Ss1, Sc1, Ss2, Sc2 is connected to a common ground terminal.

The pair of two elements Ele1, Ele2 are provided such that the arrangement orientations are different from each other. That is, the pair of two elements Ele1, Ele2 are provided such that the characteristic of a change in electrical resistance value to the direction of a magnetic field that acts on each of the elements Ele1, Ele2 is different from each other. Therefore, when the magnet portion 310 rotates and then the direction of a magnetic field that acts on each of the elements Ele1, Ele2 rotates, the voltage of the output signal of the corresponding MR sensor S fluctuates in synchronization with the rotation of the direction of the magnetic field. This voltage fluctuation changes in a sinusoidal shape in response to the rotation angle of the motor 20.

The four MR sensors Ss1, Sc1, Ss2, Sc2 in the sensor portion 320 each output a periodical signal of which a voltage fluctuates in a sinusoidal shape with the rotation of the motor 20. The four MR sensors Ss1, Sc1, Ss2, Sc2 are arranged such that the phase of the voltage waveform of each output signal is shifted by $\pi/2$.

Where the output voltage of the MR sensor Ss1 is V sin 1, the output voltage of the MR sensor Sc1 is V cos 1, the output voltage of the MR sensor Ss2 is V sin 2 and the output voltage of the MR sensor Sc2 is V cos 2, the output voltages V sin 1, V cos 1, V sin 2, V cos 2 are respectively expressed by the following mathematical expressions (1) to (4).

$$V \sin 1 = Vcc/2 + Vt \cdot \sin \theta \quad (1)$$

$$V \cos 1 = Vcc/2 + Vt \cdot \cos \theta \quad (2)$$

$$V \sin 2 = Vcc/2 - Vt \cdot \sin \theta \quad (3)$$

$$V \cos 2 = Vcc/2 - Vt \cdot \cos \theta \quad (4)$$

θ indicates an angle at which the magnet portion 310 is rotated from a preset relative rotation reference position between the magnet portion 310 and the sensor portion 320. Vt indicates a constant voltage amplitude.

Sinusoidal (cosinusoidal) voltage signals of which the phases mutually deviate from one another by π/2 are obtained by offsetting the output voltages V sin 1, V cos 1, V sin 2, V cos 2 of the MR sensors Ss1, Sc1, Ss2, Sc2 by the amount of direct-current component (Vcc/2) included therein. In calculating a motor rotation angle, voltage values that are offset from the output voltages V sin 1, V cos 1, V sin 2, V cos 2 by the amount of direct-current component (Vcc/2=Constant), that is, voltage values with reference to zero V (origin) set at the center (Vcc/2) of the amplitude of the sinusoidal voltage signal, are used. Therefore, hereinafter, the output voltages V sin 1, V cos 1, V sin 2, V cos 2 that are used to calculate the motor rotation angle may be replaced as expressed by the following mathematical expressions (5) to (8).

$$V \sin 1 = Vt \cdot \sin \theta \quad (5)$$

$$V \cos 1 = Vt \cdot \cos \theta \quad (6)$$

$$V \sin 2 = -Vt \cdot \sin \theta \quad (7)$$

$$V \cos 2 = -Vt \cdot \cos \theta \quad (8)$$

When each of the MR sensors Ss1, Sc1, Ss2, Sc2 is of a type that is configured such that the output signal fluctuates at a period of N (N: natural number) with respect to one rotation of the motor 20, an actual rotation angle of the rotor 20a of motor 20 may be calculated as 1/N of the motor rotation angle θ. Hereinafter, description will be made on the assumption that θ in the output signal of each of the MR sensors Ss1, Sc1, Ss2, Sc2 is the motor rotation angle.

In the thus configured sensor portion 320, the output voltages V sin 1, V cos 1 of which the phases deviate from each other by π/2 are output from the first rotation angle sensor 31 to the assist ECU 100, and the output voltages V sin 2, V cos 2 of which the phases deviate from each other by π/2 are output from the second rotation angle sensor 32 to the assist ECU 100. Hereinafter, voltage signals that are output from the first rotation angle sensor 31 are referred to as detected signals V sin 1, V cos 1, and voltage signals that are output from the second rotation angle sensor 32 are referred to as detected signals V sin 2, V cos 2. The assist ECU 100 uses the detected signals V sin 1, V cos 1, V sin 2, V cos 2 to calculate the rotation angle θ of the motor 20, and calculates an electrical angle required to control the phase of the motor 20 from the rotation angle θ.

Next, the assist ECU 100 will be described. Not only the above-described torque sensor 21, steering angle sensor 22 and rotation angle sensor unit 30 but also a vehicle speed sensor 23 is connected to the assist ECU 100. The vehicle speed sensor 23 outputs, to the assist ECU 100, a detected signal that indicates a speed V of the vehicle (hereinafter, which may be referred to as vehicle speed V).

Figure 4:
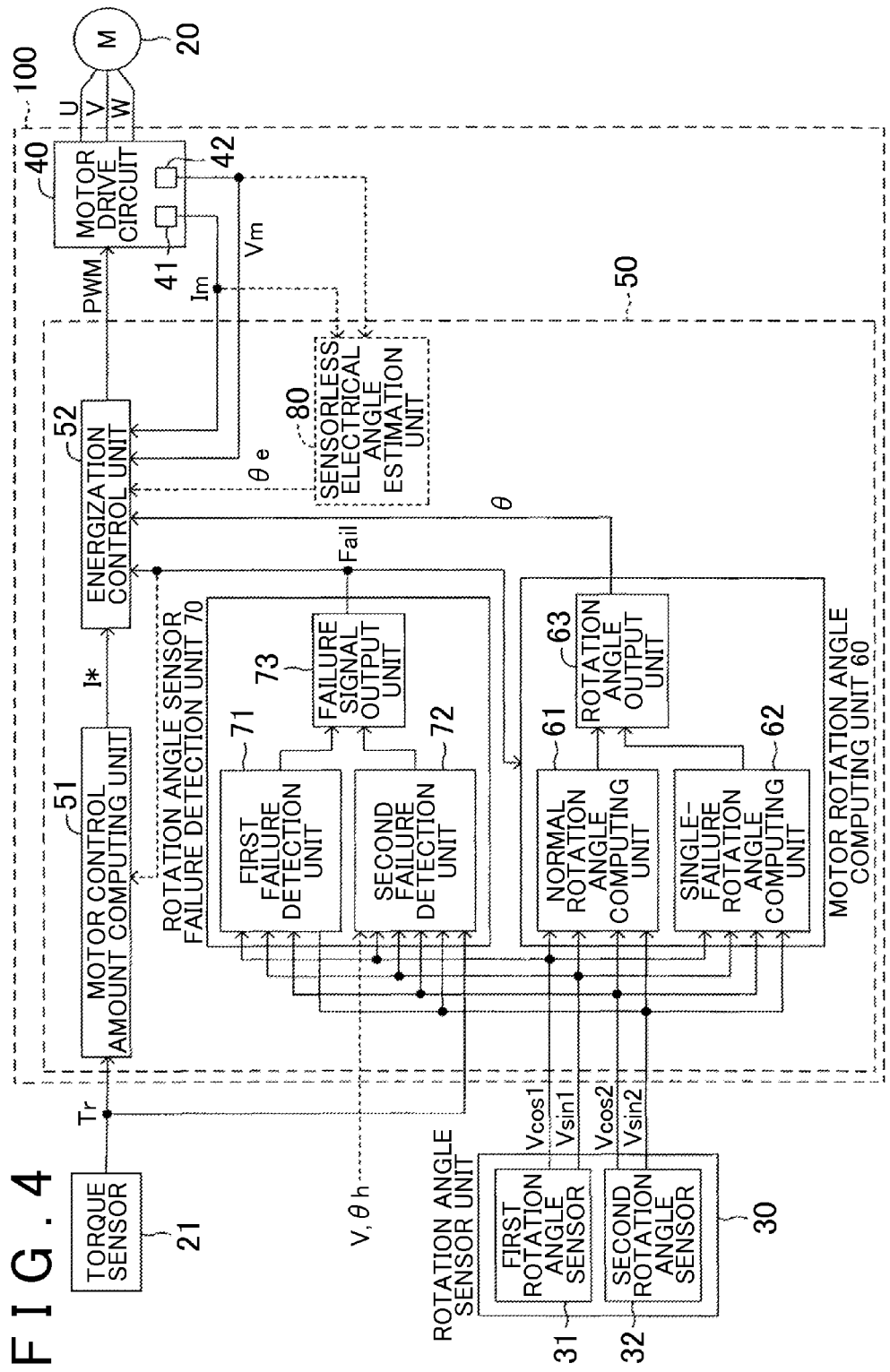
FIG. 4 is a functional block diagram of an assist ECU.

As shown in FIG. 4, the assist ECU 100 includes an assist computation unit 50 and a motor drive circuit 40. The assist computation unit 50 calculates target control amounts of the motor 20, and outputs switch drive signals based on the calculated target control amounts. The motor drive circuit 40 drives the motor 20 in accordance with the switch drive signals output from the assist computation unit 50. The motor drive circuit 40 is, for example, formed of an inverter circuit. The motor drive circuit 40 adjusts the amount of current that is supplied to the motor 20 by inputting the switch drive signals (PWM control signals) output from the assist computation unit 50 to control the duty ratios of the internal switching elements. A current sensor 41 and a voltage sensor 42 are provided in the motor drive circuit 40. The current sensor 41 detects motor currents Im respectively flowing through the three phases of the motor 20. The voltage sensor 42 detects terminal voltages Vm of the three-phase terminals of the motor 20.

The assist computation unit 50 includes a microcomputer, various input/output interfaces, a switch driving circuit, and the like. The microcomputer is composed of a CPU, a ROM, a RAM, and the like. The switch driving circuit supplies the switch drive signals to the motor drive circuit 40.

Focusing on the functions of the assist computation unit 50, the assist computation unit 50 includes a motor control amount computation unit 51, an energization control unit 52, a motor rotation angle computation unit 60 and a rotation angle sensor failure detection unit 70. The motor control amount computation unit 51 calculates command current values that are the control amounts of the motor 20. The energization control unit 52 controls the operation of the motor drive circuit 40 such that three-phase currents corresponding to the command current values flow through the motor 20. The motor rotation angle computation unit 60 calculates the motor rotation angle θ on the basis of the detected signals V sin 1, V cos 1, V sin 2, V cos 2 output from the rotation angle sensor unit 30. The rotation angle sensor failure detection unit 70 detects a failure of the rotation angle sensor unit 30.

The motor control amount computation unit 51 receives the steering torque Tr that is detected by the torque sensor 21, and calculates a target assist torque Ta* by consulting a normal assist map shown in FIG. 5A. The normal assist map is relational data in which the relationship between a steering torque Tr and a target assist torque Ta* is set, and has such a characteristic that a larger target assist torque Ta* is set as the magnitude (absolute value) of the steering torque Tr increases. FIG. 5A and FIG. 5B show a leftward steering assist characteristic; however, in a rightward steering assist characteristic, the magnitude is the same as that of the leftward steering assist characteristic except that a direction in which torque is generated is different. In calculating the target assist torque Ta*, for example, by combining the steering torque Tr with the vehicle speed V, such a target assist torque Ta* that increases as the magnitude (absolute value) of the steering torque Tr increases and reduces as the vehicle speed V increase may be set.

The motor control amount computation unit 51 receives the target assist torque Ta*, and calculates assist command currents I* that are target currents required to generate the target assist torque Ta* by dividing the target assist torque Ta* by the torque constant of the motor 20. The motor control amount computation unit 51 supplies the calculated assist command currents I* to the energization control unit 52.

The energization control unit 52 loads the motor currents Im (referred to as actual currents Im) that are detected by the current sensor 41, calculates deviations between the assist command currents I* and the actual currents Im, and calculates target voltages V* such that the actual currents Im follow the assist command currents I* through proportionalplus-integral control using the calculated deviations. PWM control signals (switch drive signals) corresponding to the target voltages V* are output to the switching elements of the motor drive circuit (inverter) 40. Thus, the motor 20 is driven, and the steering assist torque following the target assist torque Ta* is applied to the steering mechanism 10.

In this case, the energization control unit 52 receives the motor rotation angle θ supplied from the motor rotation angle computation unit 60, converts the motor rotation angle θ to an electrical angle, and controls the phase angles of the assist command currents I* on the basis of the electrical angle. For example, the energization control unit 52 controls the driving of the motor 20 through current vector control using a d-q coordinate system on the basis of the electrical angle converted from the motor rotation angle θ. The d-q coordinate system defines a d-axis that is set in a direction in which a magnetic field of each permanent magnet of the motor 20 extends and a q-axis that is set in a direction perpendicular to the d-axis (a direction that is advanced by π/2 in electrical angle from the d-axis).

The energization control unit 52 receives a failure detection signal "Fail" from the rotation angle sensor failure detection unit 70. The failure detection signal "Fail" indicates a detection status of a failure of the rotation angle sensor unit 30. The failure detection signal "Fail" is a signal that indicates a failure sensor as to whether there is a failure in any one of the sensors in the rotation angle sensor unit 30, that is, whether there is a failure in any one of the first rotation angle sensor 31 and the second rotation angle sensor 32. When the failure detection signal "Fail" indicates that no failure of the rotation angle sensor unit 30 has been detected or a failure of only one rotation angle sensor (the first rotation angle sensor 31 or the second rotation angle sensor 32) has been detected, the energization control unit 52 continues steering assist control. That is, steering assist based on the steering torque Tr is carried out. On the other hand, when the failure detection signal "Fail" indicates that a failure of each of the two rotation angle sensors (both the first rotation angle sensor 31 and the second rotation angle sensor 32) has been detected, steering assist is stopped.

The motor rotation angle computation unit 60 receives detected signals (output voltages V sin 1, V cos 1, V sin 2, V cos 2) that are output from the first rotation angle sensor 31 and the second rotation angle sensor 32, and calculates the motor rotation angle θ. The motor rotation angle computation unit 60 includes a normal rotation angle computation unit 61, a single-failure rotation angle computation unit 62 and a rotation angle output unit 63.

The motor rotation angle computation unit 60 receives the failure detection signal "Fail" that is output from the rotation angle sensor failure detection unit 70, and, when the failure detection signal "Fail" indicates that both of the first rotation angle sensor 31 and the second rotation angle sensor 32 are normal (no failure has been detected), the normal rotation angle computation unit 61 calculates the motor rotation angle θ. When the failure detection signal "Fail" indicates that a failure of only one of the rotation angle sensors (the first rotation angle sensor 31 or the second rotation angle sensor 32) has been detected, the single-failure rotation angle computation unit 62 calculates the motor rotation angle θ by the use of the other one of the first rotation angle sensor 31 and the second rotation angle sensor 32, in which no failure has been detected.

The normal rotation angle computation unit 61 is allowed to calculate the motor rotation angle θ even with the use of any one of the first rotation angle sensor 31 and the second rotation angle sensor 32. For example, the motor rotation angle θ is allowed to be calculated by using the output voltages V sin 1, V cos 1 of the first rotation angle sensor 31 as expressed by the following mathematical expression.

$$\theta = \tan^{-1}(\sin\theta/\cos\theta) = \tan^{-1}(V\sin 1/V\cos 1) \qquad (9)$$

Similarly, the motor rotation angle θ is allowed to be calculated by using the output voltages V sin 2, V cos 2 of the second rotation angle sensor 32 as expressed by the following mathematical expression.

$$\theta = \tan^{-1}(\sin\theta/\cos\theta) = \tan^{-1}(V\sin 2/V\cos 2) \qquad (10)$$

In calculating the motor rotation angle θ, two solutions are obtained; however, the angle of θ that falls within the first quadrant (0° to 90°) is selected when sin θ and cos θ are positive values, the angle of θ that falls within the second quadrant (90° to 180°) is selected when sin θ is a positive value and cos θ is a negative value, the angle of θ that falls within the third quadrant (180° to 270°) is selected when sin θ and cos θ are negative values, and the angle of θ that falls within the fourth quadrant (270° to 360°) is selected when sin θ is a negative value and cos θ is a positive value. Hereinafter, calculation of an arc tangent conforms to this rule.

When both the first rotation angle sensor 31 and the second rotation angle sensor 32 are normal, the motor rotation angle θ is allowed to be calculated by using one of output signals of each of the first rotation angle sensor 31 and the second rotation angle sensor 32 (output signals of which the phases deviate from each other by π/2). For example, when the output voltage V sin 1 of the MR sensor Ss1 and the output voltage V cos 2 of the MR sensor Sc2 are used, the motor rotation angle θ is allowed to be calculated with the use of the following mathematical expression (11).

$$\theta = \tan^{-1}(\sin\theta/\cos\theta) = \tan^{-1}(V\sin 1/-V\cos 2) \qquad (11)$$

When the output voltage V cos 1 of the MR sensor Sc1 and the output voltage V sin 2 of the MR sensor Ss2 are used, the motor rotation angle θ is allowed to be calculated with the use of the following mathematical expression (12).

$$\theta = \tan^{-1}(\sin\theta/\cos\theta) = \tan^{-1}(-V\sin 2/V\cos 1) \qquad (12)$$

When the motor rotation angle is calculated with the use of the mathematical expression (11) or the mathematical expression (12) in this way, it may be assumed that the first rotation angle sensor 31 (or the second rotation angle sensor 32) is formed of the MR sensor Ss1 and the MR sensor Sc2 and the second rotation angle sensor 32 (or the first rotation angle sensor 31) is formed of the MR sensor Ss2 and the MR sensor Sc1.

Alternatively, the motor rotation angle θ may be calculated by using all the output voltages V sin 1, V cos 1, V sin 2, V cos 2 that are output from the first rotation angle sensor 31 and the second rotation angle sensor 32. For example, a voltage difference Vs1−s2 that indicates a difference (V sin 1−V sin 2) between the output voltage V sin 1 of the MR sensor Ss1 and the output voltage V sin 2 of the MR sensor Ss2 and a voltage difference Vc1−c2 that indicates a difference (V cos 1−V cos 2) between the output voltage V cos 1 of the MR sensor Sc1 and the output voltage V cos 2 of the MR sensor Sc2 are respectively expressed by the following mathematical expressions (13), (14).

$$Vs1-s2 = Vt\cdot\sin\theta - (-Vt\cdot\sin\theta) = 2Vt\cdot\sin\theta \qquad (13)$$

$$Vc1-c2 = Vt\cdot\cos\theta - (-Vt\cdot\cos\theta) = 2Vt\cdot\cos\theta \qquad (14)$$

Therefore, the motor rotation angle θ is also allowed to be calculated with the use of the following mathematical expression (15).

$$\theta=\tan^{-1}(\sin\theta/\cos\theta)=\tan^{-1}(Vs1-s2/Vc1-c2) \qquad (15)$$

The normal rotation angle computation unit 61 outputs the motor rotation angle θ calculated with the use of one of the above-described calculating formulae (9), (10), (11), (12), the mean value of the motor rotation angles respectively calculated with the use of a plurality of the calculating formulae, or the motor rotation angle calculated with the use of the calculating formula (15), as a calculated result. The mean value of the sine signals (V sin 1, V sin 2) and the mean value of the cosine signals (V cos 1, V cos 2) in the first rotation angle sensor 31 and the second rotation angle sensor 32 may be calculated, and then the motor rotation angle θ may be calculated by using the mean values.

The single-failure rotation angle computation unit 62 calculates the motor rotation angle θ with the use of any one of the calculating formulae (9), (10), (11), (12) on the basis of the output voltages that are output from the rotation angle sensor in which no failure has been detected (the first rotation angle sensor 31 or the second rotation angle sensor 32). For example, when a failure of the MR sensor Sc1 of the first rotation angle sensor 31 has been detected, the motor rotation angle θ is calculated by using the detected signals V sin 2, V cos 2 of the second rotation angle sensor 32 without using the detected signals V sin 1, V cos 1 of the MR sensor Sc1 and MR sensor Ss1.

The rotation angle output unit 63 outputs the motor rotation angle θ, calculated by the normal rotation angle computation unit 61 or the single-failure rotation angle computation unit 62, to the energization control unit 52.

The rotation angle sensor failure detection unit 70 includes a first failure detection unit 71, a second failure detection unit 72 and a failure signal output unit 73. The first failure detection unit 71 is activated in the situation in which no failure has been detected in both of the rotation angle sensors (the first rotation angle sensor 31 and the second rotation angle sensor 32). The first failure detection unit 71 determines whether there is a failure in any one of the first rotation angle sensor 31 and the second rotation angle sensor 32, and identifies one of the first rotation angle sensor 31 and the second rotation angle sensor 32, in which there is a failure. This determination may be regarded as a first failure determination.

On the other hand, the second failure detection unit 72 is activated in the situation in which a failure of any one of the first rotation angle sensor 31 and the second rotation angle sensor 32 has been detected by the first failure detection unit 71. The second failure detection unit 72 determines whether there is a failure in the remaining one of the first rotation angle sensor 31 and the second rotation angle sensor 32 (the rotation angle sensor in which no failure has been detected).

The failure signal output unit 73 outputs the failure detection signal "Fail" to the energization control unit 52 and the motor rotation angle computation unit 60. The failure detection signal "Fail" indicates the status of a failure of the rotation angle sensor unit 30. For example, the failure detection signal "Fail" indicates "0" when both of the first rotation angle sensor 31 and the second rotation angle sensor 32 are normal (no failure has been detected), indicates "1" when only a failure of the first rotation angle sensor 31 has been detected, indicates "2" when only a failure of the second rotation angle sensor 32 has been detected, and indicates "3" when a failure of each of the first rotation angle sensor 31 and the second rotation angle sensor 32 has been detected.

The first failure detection unit 71 uses the output signals of the first rotation angle sensor 31 and the output signals of the second rotation angle sensor 32 to determine on the basis of deviations between the corresponding output signals whether there is a failure in any one of the first rotation angle sensor 31 and the second rotation angle sensor 32. For example, the first failure detection unit 71 calculates a deviation |θ1−θ2| between a motor rotation angle (referred to as first computed motor rotation angle θ1), which is calculated from the output voltages V sin 1, V cos 1 of the first rotation angle sensor 31, and a motor rotation angle (referred to as second computed motor rotation angle θ2), which is calculated from the output voltages V sin 2, V cos 2 of the second rotation angle sensor 32. When the deviation |θ1−θ2| is larger than a failure determination reference value, the first failure detection unit 71 determines that there is a failure in one of the first rotation angle sensor 31 and the second rotation angle sensor 32.

Failure determination that is performed by the first failure detection unit 71 is not limited to a comparison between the first computed motor rotation angle θ1 and the second computed motor rotation angle θ2. For example, instead of or in addition to the above-described technique, failure determination may be performed by comparing the absolute value of the output voltage V sin 1 of the first rotation angle sensor 31 with the absolute value of the output voltage V sin 2 of the second rotation angle sensor 32 (the absolute values of the output voltages V sin 1, V sin 2 coincide with each other when the first rotation angle sensor 31 and the second rotation angle sensor 32 are normal), comparing the sign of the output voltage V sin 1 of the first rotation angle sensor 31 with the sign of the output voltage V sin 2 of the second rotation angle sensor 32 (the signs of the output voltages V sin 1, V sin 2 are opposite to each other when the first rotation angle sensor 31 and the second rotation angle sensor 32 are normal), or the like. Similarly, failure determination may be performed by comparing the absolute value of the output voltage V cos 1 of the first rotation angle sensor 31 with the absolute value of the output voltage V cos 2 of the second rotation angle sensor 32 (the absolute values of the output voltages V cos 1, V cos 2 coincide with each other when the first rotation angle sensor 31 and the second rotation angle sensor 32 are normal), comparing the sign of the output voltage V cos 1 of the first rotation angle sensor 31 with the sign of the output voltage V cos 2 of the second rotation angle sensor 32 (the signs of the output voltages V cos 1, V cos 2 are opposite to each other when the first rotation angle sensor 31 and the second rotation angle sensor 32 are normal), or the like. In this way, because the first failure detection unit 71 is allowed to utilize the four output signals of the first rotation angle sensor 31 and the second rotation angle sensor 32 in failure determination, it is possible to accurately and quickly perform failure determination.

The first failure detection unit 71, in parallel with the above-described comparison operation, calculates a root-mean-square sum $\sqrt{(V\sin 1^2 + V\cos 1^2)}$ that represents the sum of the squares of the output voltages V sin 1, V cos 1 of the first rotation angle sensor 31 and a root-mean-square sum $\sqrt{(V\sin 2^2 + V\cos 2^2)}$ that represents the sum of the squares of the output voltages V sin 2, V cos 2 of the second rotation angle sensor 32. For the first rotation angle sensor 31 or the second rotation angle sensor 32, in which there is no failure, this calculated result is $\sqrt{(Vt^2(\sin\theta^2 + \cos\theta^2))} = Vt$, and is a preset constant value.

Figure 6:
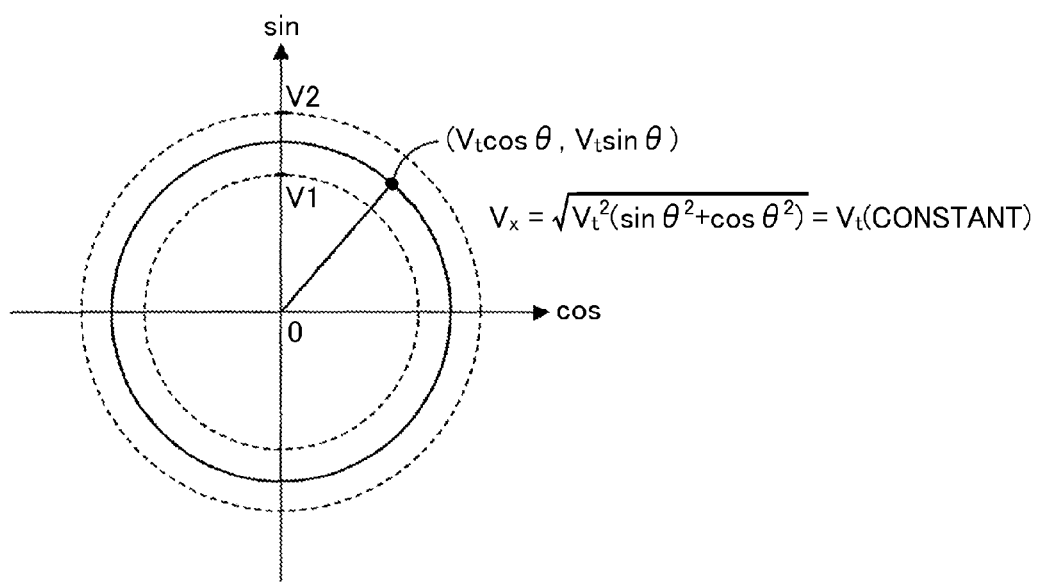
FIG. 6 is a graph that shows a determination as to whether there is a failure by the use of a root-mean-square sum.

When the first computed motor rotation angle θ1 and the second computed motor rotation angle θ2 deviate from each other, the root-mean-square sum of the output voltages of one of the first rotation angle sensor 31 and the second rotation angle sensor 32 takes an abnormal value. Therefore, the first failure detection unit 71 is able to identify one of the first rotation angle sensor 31 and the second rotation angle sensor 32, of which the calculated root-mean-square sum of the corresponding output voltages falls outside an allowable range, as the first rotation angle sensor 31 or the second rotation angle sensor 32, in which there is a failure. For example, as shown in FIG. 6, where the value of the root-mean-square sum is Vx, when the root-mean-square sum Vx is larger than or equal to V1 (=Vt−α) that is the lower limit value of the allowable range and is smaller than or equal to V2 (=Vt+α) that is the upper limit value of the allowable range, it may be determined that the rotation angle sensor is normal; otherwise, it may be determined that there is a failure in the rotation angle sensor. Failure determination based on the magnitude of $Vt^2$ that is obtained by calculating a square sum while omitting calculation of the square root is also substantially the same.

The second failure detection unit 72 is a functional unit that detects a failure of the other one of the first rotation angle sensor 31 and the second rotation angle sensor 32, which is different from the rotation angle sensor in which a failure has been detected by the first failure detection unit 71. As described above, when both of the first rotation angle sensor 31 and the second rotation angle sensor 32 are normal, it is possible to reliably determine that there is a failure in one of the first rotation angle sensor 31 and the second rotation angle sensor 32, by using (comparing) the four output signals of the first rotation angle sensor 31 and the second rotation angle sensor 32. However, after a failure of one of the first rotation angle sensor 31 and the second rotation angle sensor 32 has been detected, an appropriate comparison target disappears, so it is difficult to accurately determine that there is a failure in the remaining one of the first rotation angle sensor 31 and the second rotation angle sensor 32. Hereinafter, the reason will be described below.

Figure 7:
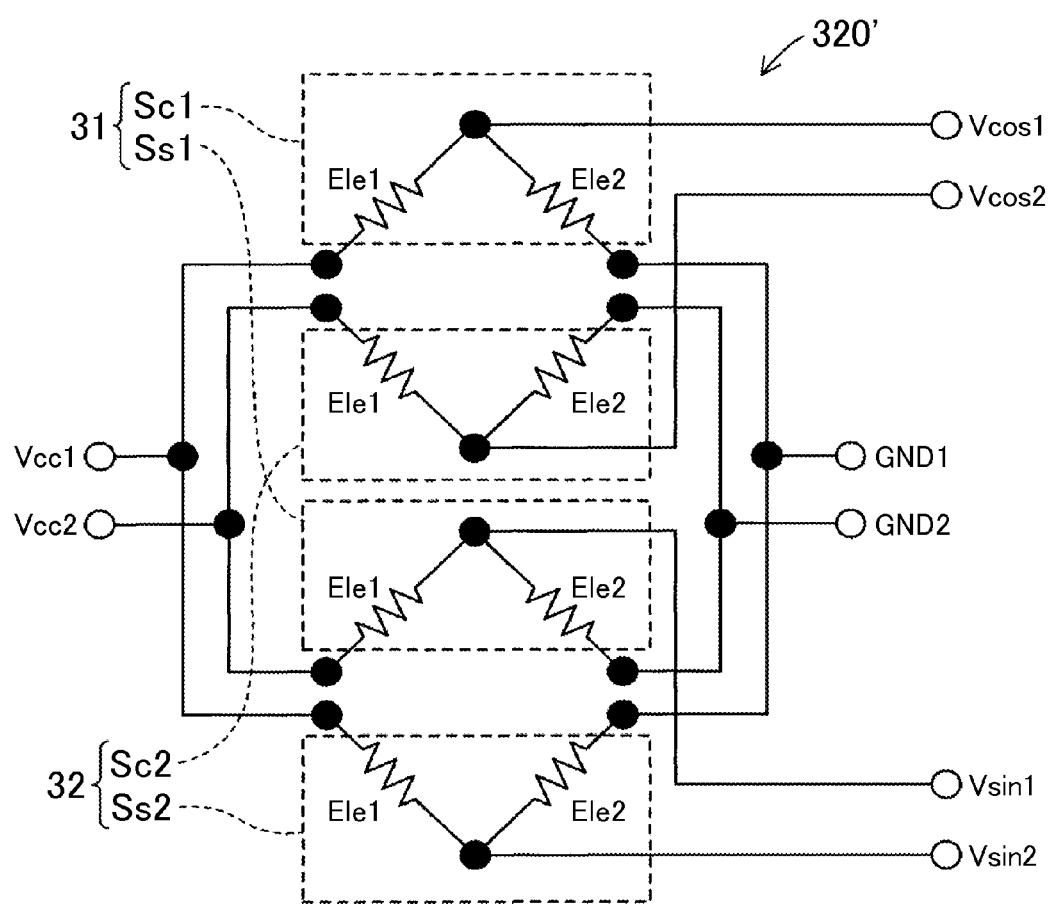
FIG. 7 is a circuit configuration view of a sensor portion of a type in which a power supply circuit is not shared.

For example, the rotation angle sensor described in JP 2012-98231 A is configured such that voltages are respectively applied from independent power supply circuits to the MR sensors Sc1, Ss2 and the MR sensors Ss1, Sc2 in the first rotation angle sensor 31 and the second rotation angle sensor 32, as shown in FIG. 7. With this configuration, even in the situation in which a failure of one of the first rotation angle sensor 31 and the second rotation angle sensor 32 has been detected, it is mostly possible to detect a failure by comparing the output voltages V sin 2, V cos 2 of the two MR sensors Ss2, Sc2 in the second rotation angle sensor 32 in which no failure has been detected or comparing the output voltages V sin 1, V cos 1 of the two MR sensors Ss1, Sc1 in the first rotation angle sensor 31 in which no failure has been detected.

However, the configuration that a power supply terminal and a ground terminal are shared between the first rotation angle sensor 31 and the second rotation angle sensor 32 as in the case of the present embodiment is also generally employed. In this way, in the case of the configuration that a power supply circuit is shared between the first rotation angle sensor 31 and the second rotation angle sensor 32, for example, when the voltage Vcc at the power supply terminal is fixed to an abnormal value (an intermediate voltage value lower than an appropriate voltage) (for example, the power supply voltage Vcc that should be originally 5 V is 3 V), there occurs a failure mode that influences at the same time the output signals of the two MR sensors Ss2, Sc2 of the second rotation angle sensor 32 in which no failure has been detected or the outputs signals of the two MR sensors Ss1, Sc1 of the first rotation angle sensor 31 in which no failure has been detected. In this case, even when the output voltages V sin 2, V cos 2 of the two MR sensors Ss2, Sc2 of the remaining one second rotation angle sensor 32 or the output voltages V sin 1, V cos 1 of the two MR sensors Ss1, Sc1 of the remaining one first rotation angle sensor 31 are compared with each other, it may be difficult to detect a failure or it may take time to detect a failure.

For example, there may be such a failure that the output signals of the two MR sensors Ss2, Sc2 are fixed to a wrong intermediate voltage (any voltage within an original voltage range) in the remaining one second rotation angle sensor 32 or a failure that the output signals of the two MR sensors Ss1, Sc1 are fixed to a wrong intermediate voltage (any voltage within an original voltage range) in the remaining one first rotation angle sensor 31. In this case, the root-mean-square sum $\sqrt{(V \sin 1^2 + V \cos 1^2)}$ is also fixed. In such a case, it is difficult to determine whether no steering operation is carried out (including keeping the steering wheel at a certain angle) or there is a failure in the remaining one of the first rotation angle sensor 31 and the second rotation angle sensor 32. That is, because the output signals of the two MR sensors Ss2, Sc2 or the output signals of the two MR sensors Ss1, Sc1 indicate similar values to those in the case where no steering operation is carried out, it is difficult to reliably determine a failure even by comparing the output voltages V sin 2, V cos 2 of the two MR sensors Ss2, Sc2 with each other or comparing the output voltages V sin 1, V cos 1 of the MR sensors Ss1, Sc1 with each other. In a state where both of the first rotation angle sensor 31 and the second rotation angle sensor 32 are normal, it is substantially not presumable that the output signals of the four MR sensors Sc1, Ss1, Sc2, Ss2 are fixed to an intermediate voltage from that state at the same time, so it is possible to detect a signal fixation failure of one of the first rotation angle sensor 31 and the second rotation angle sensor 32 by comparing the output signals of the two MR sensors Ss2, Sc2 with each other or comparing the output signals of the two MR sensors Ss1, Sc1 with each other.

Figure 8:
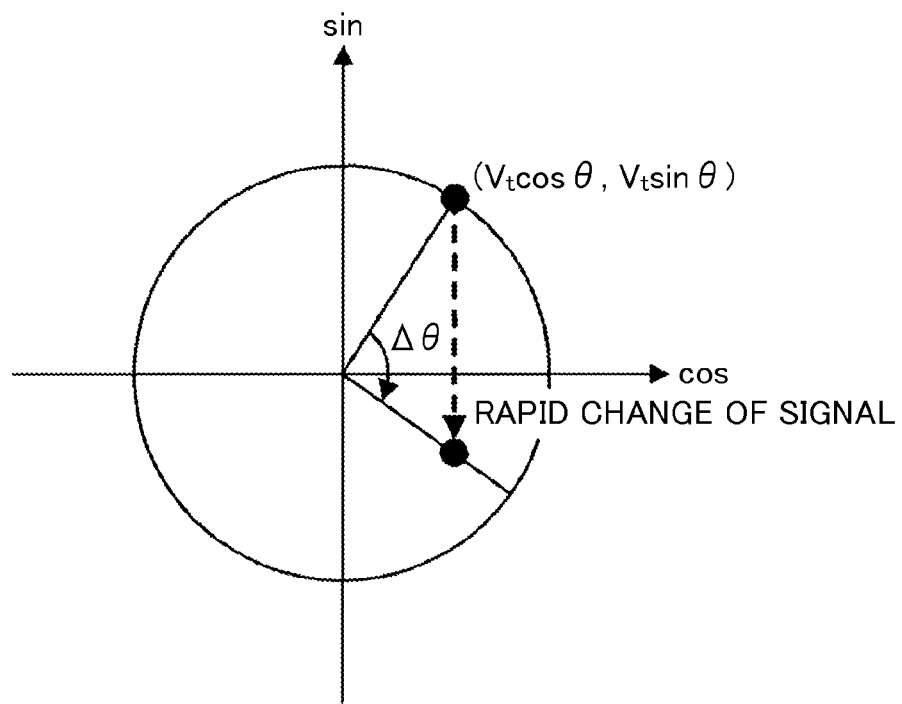
FIG. 8 is a graph that illustrates a rapid change failure of a detected signal.
Figure 9:
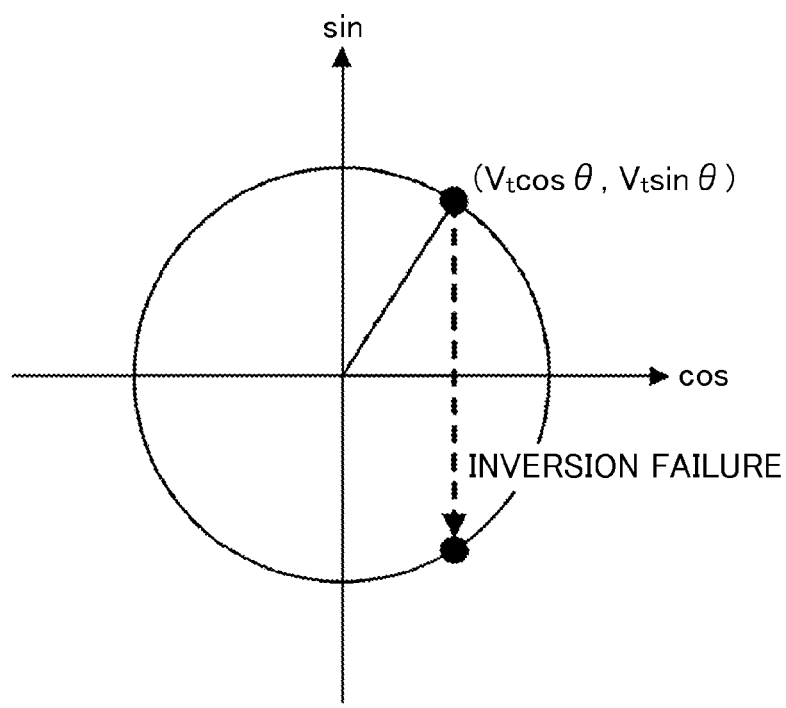
FIG. 9 is a graph that illustrates an inversion failure of a detected signal.

Even when there is a failure in one of the two MR sensors Ss2, Sc2 of the remaining one second rotation angle sensor 32 or when there is a failure in one of the two MR sensors Ss1, Sc1 of the remaining one first rotation angle sensor 31, failure determination using the root-mean-square sum of the output voltages may take time to finally determine a failure or, at worst, may not be able to detect a failure. For example, as shown in FIG. 8, even when the output voltage of the MR sensor Sc2 that is one of the two MR sensors Ss2, Sc2 rapidly changes and the value of the root-mean-square sum of the output voltages becomes an abnormal value, the output voltage may change as shown in FIG. 9 before a lapse of a set time required to finally determine a failure. That is, when only the sign of the output voltage of the MR sensor Sc2 is inverted from a normal value (referred to as inversion failure), the value of the root-mean-square sum of the output voltages is $\sqrt{(Vt^2(\sin \theta^2 + \cos \theta^2))} = Vt$ (normal value), so it is not possible to finally determine that there is a failure in the MR sensor Sc2.

Generally, in order to prevent erroneous failure detection, a technique for finally determining a failure after determining that an abnormal state has continued for a set time is employed. Therefore, for example, as shown in FIG. 8, even when the output voltage of the MR sensor Sc2 rapidly changes and the value of the root-mean-square sum of the output voltages becomes an abnormal value, but when the sign of the output voltage is inverted as shown in FIG. 9 before a lapse of the set time, the value of the root-mean-square sum of the output voltages returns to a normal value.

In such a case, it takes time to finally determine a failure or, at worst, it is not possible to detect a failure.

For example, in the situation in which both of the first rotation angle sensor 31 and the second rotation angle sensor 32 are normal, because it is possible to determine a failure by using (comparing) the four output signals of the first rotation angle sensor 31 and the second rotation angle sensor 32, it is possible to reduce a time required to finally determine a failure. That is, when the value of the root-mean-square sum of the output voltages of one of the first rotation angle sensor 31 and the second rotation angle sensor 32 is normal, it is possible to determine a failure of the rotation angle sensor, of which the value of the root-mean-square sum of the output voltages has rapidly changed, in the early stage after the rapid change is detected. However, in the situation in which a failure of one of the first rotation angle sensor 31 and the second rotation angle sensor 32 is finally determined, it is required to take longer time to determine a failure of the remaining one of the first rotation angle sensor 31 and the second rotation angle sensor 32 under the risk of erroneous detection. Therefore, when there occurs an inversion failure in a period during which a lapse of a time for finally determining a failure is being waited, it is not possible to determine a failure.

In this way, when the motor rotation angle is detected with the use of the remaining one of the first rotation angle sensor 31 and the second rotation angle sensor 32, it may not be possible to accurately detect a failure only by using the output signals of the remaining one of the first rotation angle sensor 31 and the second rotation angle sensor 32. When the output voltage rapidly changes, the motor rotation angle to be computed also rapidly changes. Therefore, in a period from occurrence of a failure to final determination of the failure, steering assist may be significantly mistaken or wrong steering assist may be carried out for a long time.

The second failure detection unit 72 properly detects a failure of the remaining one of the first rotation angle sensor 31 and the second rotation angle sensor 32 by adding failure determination based on fluctuations in steering torque Tr in addition to failure determination based on the root-mean-square sum of the output signals of the remaining one of the first rotation angle sensor 31 and the second rotation angle sensor 32.

Figure 10A:
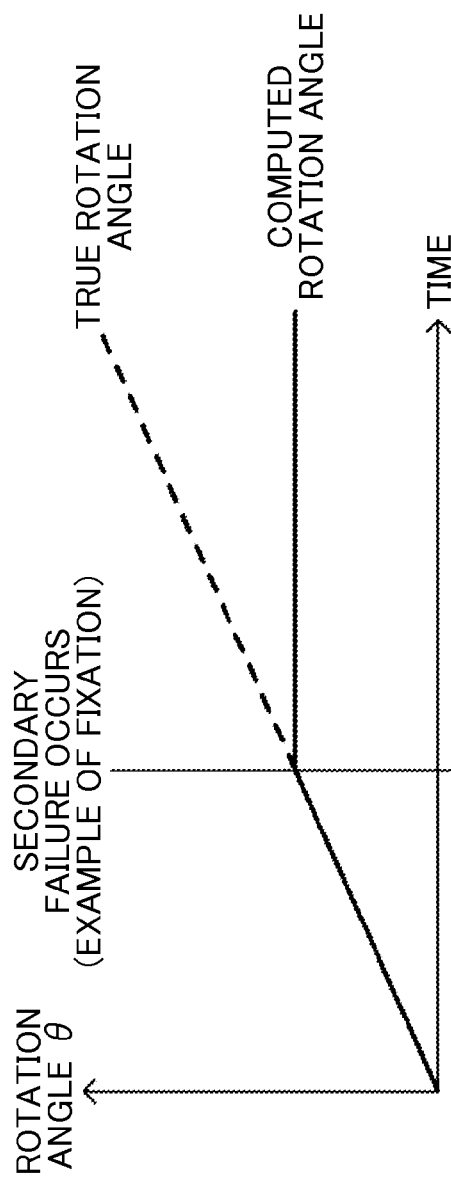
FIG. 10A is a graph that shows change in rotation angle in the event of a signal fixation failure.

When steering assist control is executed on the basis of the motor rotation angle $\theta$ calculated by using the output signals of the remaining one of the first rotation angle sensor 31 and the second rotation angle sensor 32, and when there is a failure in the remaining one of the first rotation angle sensor 31 and the second rotation angle sensor 32, a specific change appears in the steering torque Tr. For example, it is presumable that there occurs a failure that the output signals of the two MR sensors Sc1, Ss1 of the remaining first rotation angle sensor 31 or the output signals of the two MR sensors Sc2, Ss2 of the remaining second rotation angle sensor 32 are fixed to a certain voltage at the same time (referred to as signal fixation failure). In this case, as shown in FIG. 10A, the motor rotation angle $\theta$ to be calculated is constant at the timing at which there occurs a failure.

Figure 10B:
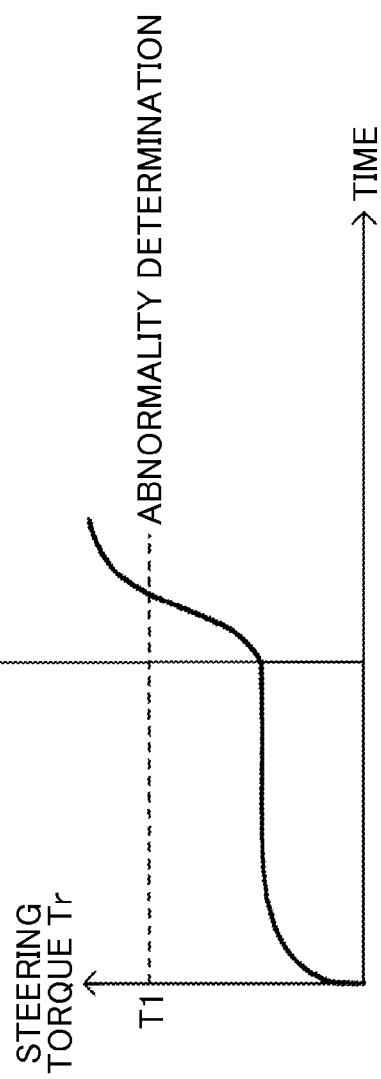
FIG. 10B is a graph that shows change in steering torque in the event of a signal fixation failure.

Therefore, although the motor 20 is rotating, the constant motor rotation angle $\theta$ is supplied to the energization control unit 52. Therefore, it is not possible to advance the electrical angle of the motor 20 in the rotation direction, and the steering assist torque reduces. As a result, a driver unconsciously operates the steering wheel 11 so as to compensate for the reduction in the steering assist torque. Thus, the steering torque Tr that is detected by the torque sensor 21 rapidly increases as shown in FIG. 10B.

The steering torque Tr falls within the range of an expected width when the remaining one of the first rotation angle sensor 31 and the second rotation angle sensor 32 is normal and energization control over the motor 20 is appropriately carried out; however, the steering torque Tr exceeds the assumed range when there occurs a signal fixation failure in the remaining one of the first rotation angle sensor 31 and the second rotation angle sensor 32 and, as a result, the motor rotation angle $\theta$ is fixed to a constant value. Therefore, by detecting such a specific behavior (increase) of the steering torque Tr, it is possible to determine that there is a signal fixation failure in the remaining one of the first rotation angle sensor 31 and the second rotation angle sensor 32.

Figure 11A:
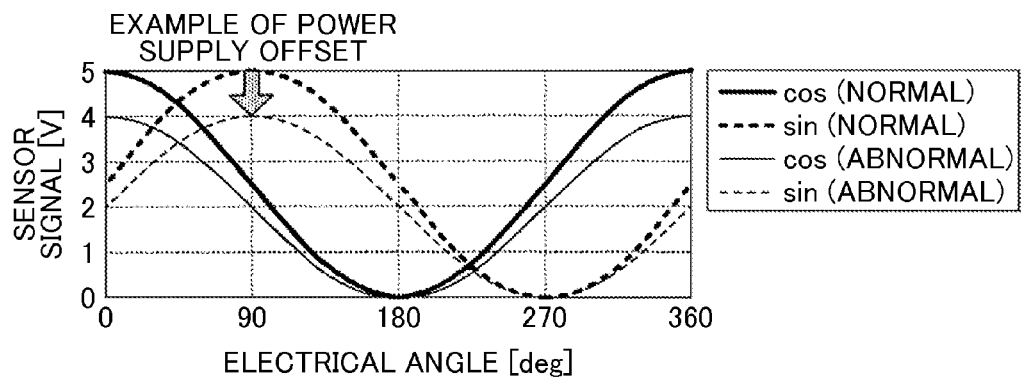
FIG. 11A is a graph that shows change in detected signal in the event of a power supply offset failure.
Figure 11B:
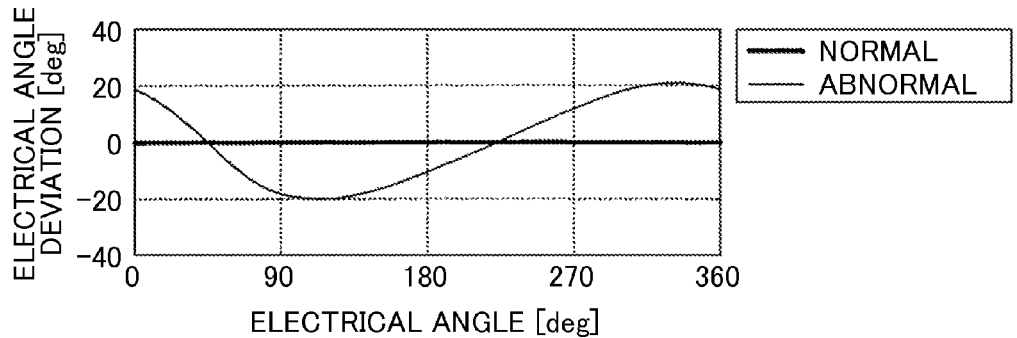
FIG. 11B is a graph that shows change in electrical angle deviation in the event of a power supply offset failure.

As another failure pattern, there occurs such a failure that the power supply voltage Vcc is fixed to an intermediate voltage lower than a normal voltage (referred to as power supply offset failure) in the remaining one of the first rotation angle sensor 31 and the second rotation angle sensor 32. In this case, as shown in FIG. 11A, the voltages of the output signals of the remaining one of the first rotation angle sensor 31 and the second rotation angle sensor 32 change. In this example, an example in which the power supply voltage Vcc changes from 5 V to 4 V is shown. In this case, in the output signals of the remaining one of the first rotation angle sensor 31 and the second rotation angle sensor 32, the midpoint (origin) of oscillation shifts from 2.5 V to 2 V, and the amplitude changes to 2 V. Thus, there is an error in a rotation angle to be calculated (here, indicated in electrical angle) as shown in FIG. 11B.

Figure 11C:
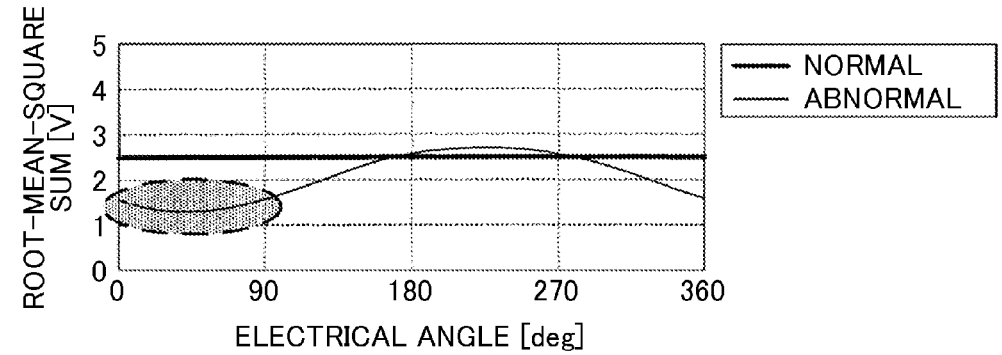
FIG. 11C is a graph that shows change in root-mean-square sum in the event of a power supply offset failure.

This error periodically fluctuates at a period of 360 degrees in electrical angle with rotation of the motor 20. In this case, when the root-mean-square sum Vx of the output voltages of the remaining one of the first rotation angle sensor 31 and the second rotation angle sensor 32 is calculated, an abnormality is not always detected, and an abnormality is not detected depending on a rotation position as shown in FIG. 11C. In this example, in the area surrounded by the dashed line in the graph, because the root-mean-square sum Vx of the output voltages significantly deviates from a normal value, it is possible to reliably detect a failure of the rotation angle sensor; however, it is not possible to detect a failure around, for example, 180 degrees or 270 degrees in electrical angle. Therefore, when a driver carries out quick steering operation, there is a case where it is not possible to detect a failure even when the root-mean-square sum of the output voltages is calculated.

When there occurs a power supply offset failure in a state where the first rotation angle sensor 31 and the second rotation angle sensor 32 are normal, the phases of the output voltages of each of the first rotation angle sensor 31 and the second rotation angle sensor 32 are shifted by $\pi$, so there is an extremely small possibility that the root-mean-square sum Vx of the output voltages of each of the first rotation angle sensor 31 and the second rotation angle sensor 32 falls within a normal value at the same time. Therefore, when there occurs a power supply offset failure in a state where the first rotation angle sensor 31 and the second rotation angle sensor 32 are normal, it is possible to quickly detect the failure.

When there occurs a power supply offset failure in the remaining one of the first rotation angle sensor 31 and the second rotation angle sensor 32 during steering, the calculated motor rotation angle $\theta$ periodically deviates from a true value as shown in FIG. 12A. Therefore, there occurs a torque ripple in the motor 20. For example, where the number of pole pairs of the motor 20 is 7, the gear ratio of the speed reducer 25 is 18.5 and the steering speed is 90 deg/s, the frequency of the torque ripple is 32 Hz (=7×18.5×90/360). In synchronization with the torque ripple, the steering torque that is input to the steering wheel 11 by a driver periodically fluctuates as shown in FIG. 12B. Such fluctuations in steering torque due to a power supply offset failure of the remaining one of the first rotation angle sensor 31 and the second rotation angle sensor 32 have a short period, and are not intentionally generated through driver's steering operation or cannot be intentionally generated through driver's steering operation. Therefore, it is possible to easily distinguish the fluctuations in steering torque from the oscillation of the steering torque resulting from driver's intentional steering operation.

Therefore, by detecting such periodical fluctuations in steering torque Tr, it is possible to determine that there is a power supply offset failure in the remaining one of the first rotation angle sensor 31 and the second rotation angle sensor 32. In this case, it may be determined that there is a failure in the remaining one of the first rotation angle sensor 31 and the second rotation angle sensor 32 when the period of fluctuations in steering torque falls within a set period range that is assumed in the event of a power supply offset failure.

Figure 13:
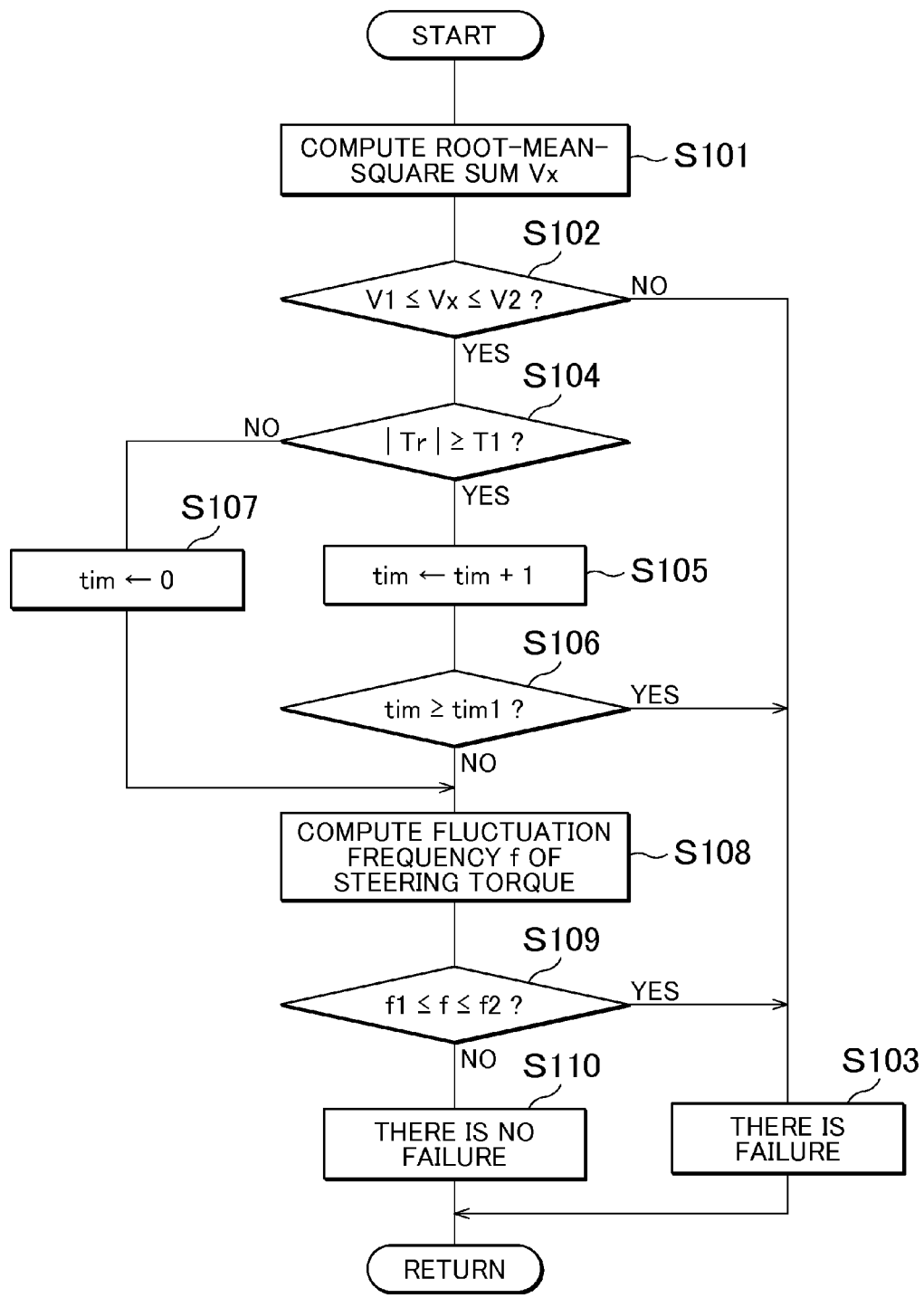
FIG. 13 is a flowchart that shows a second failure determination routine.

Hereinafter, a process that is executed in the second failure detection unit 72 will be described. FIG. 13 shows a second failure determination routine that is executed by the second failure detection unit 72. The second failure determination routine is repeatedly executed at predetermined short computation intervals. The second failure determination routine is a sub-routine that is incorporated as step S17 of a rotation angle failure handling control routine (FIG. 14A and FIG. 14B) (described later).

When the second failure determination routine is initiated, the second failure detection unit 72, in step S101, loads the detected signals V sin 1, V cos 1 of the remaining rotation angle sensor, and calculates the root-mean-square sum Vx (=√(V sin 1²+V cos 1²)) of the output voltages. The case where the remaining one rotation angle sensor (the rotation angle sensor that is different from the rotation angle sensor in which a failure has been detected by the first failure detection unit 71) is the first rotation angle sensor 31 will be described as an example.

Subsequently, the second failure detection unit 72, in step S102, determines whether the root-mean-square sum Vx is larger than or equal to V1 (=Vt−α) that is the lower limit value of the allowable range and smaller than or equal to V2 (=Vt+α) that is the upper limit value of the allowable range, that is, the root-mean-square sum Vx falls within the allowable range. α is an allowance (α>0) that is obtained by taking a detection error, and the like, into consideration. When the root-mean-square sum Vx falls outside the allowable range, the second failure detection unit 72, in step S103, determines that there is a failure in the first rotation angle sensor 31, after which the routine once ends.

On the other hand, when affirmative determination is made in step S102, that is, when no failure has been detected in determination based on the root-mean-square sum, the second failure detection unit 72 advances the process to step S104. The process from step S104 is a process of determining whether there is a failure in the remaining first rotation angle sensor 31 on the basis of fluctuations in steering torque Tr. That is, there is a case where it is not possible to detect a failure of the first rotation angle sensor 31 with the use of the root-mean-square sum, so this is the process for covering such a case.

The second failure detection unit 72, in step S104, loads the steering torque Tr that is detected by the torque sensor 21, and determines whether the magnitude of the steering torque Tr (steering torque |Tr|) is larger than or equal to a preset failure determination value T1. When the steering torque |Tr| is larger than or equal to the failure determination value T1, the second failure detection unit 72, in step S105, increments a timer counter tim by a value of 1, and, in step S106, determines whether the timer counter tim has reached a set value tim1 or above. On the other hand, when the steering torque |Tr| is smaller than the failure determination value T1, the second failure detection unit 72, in step S107, clears the value of the timer counter tim to zero. The initial value of the timer counter tim is set to zero. Thus, the timer counter tim is incremented each time the routine is repeated and it is determined that the steering torque |Tr| is larger than or equal to the failure determination value T1, and is cleared to zero when it is determined in the middle of the process that the steering torque |Tr| is smaller than the failure determination value T1. Therefore, the process of step S104 to step S107 is a process of determining whether the duration of a situation in which it is determined that the steering torque |Tr| is larger than or equal to the failure determination value T1 is longer than or equal to a set time (a time corresponding to a set value tim1).

When the second failure detection unit 72 determines that the duration of the situation in which the steering torque |Tr| is larger than or equal to the failure determination value T1 is longer than or equal to the set time (Yes in S106), the second failure detection unit 72 advances the process to step S103, and determines that there is a failure in the first rotation angle sensor 31. When there occurs a signal fixation failure in the first rotation angle sensor 31, the steering torque Tr rapidly increases as described above. Therefore, it is possible to detect a signal fixation failure through the process of step S104 to step S107. When it is not possible to detect a failure by the use of the root-mean-square sum because of factors other than the signal fixation failure, for example, occurrence of such a failure that any one of the output signals of the first rotation angle sensor 31 is inverted (Yes in S102) as well, the steering torque Tr rapidly increases, so it is possible to detect a failure of the first rotation angle sensor 31.

On the other hand, when it is determined that the duration of the situation in which the steering torque |Tr| is larger than or equal to the failure determination value T1 is shorter than the set time, the second failure detection unit 72, in step S108, computes the fluctuation frequency f of the steering torque Tr. For example, the second failure detection unit 72 samples the steering torque Tr, extracts a periodical fluctuation component of the steering torque Tr from the sampled values in a latest predetermined period, and separately computes the fluctuation frequency f of the fluctuation component.

Subsequently, the second failure detection unit 72, in step S109, determines whether the fluctuation frequency f of the steering torque Tr falls within a failure determination frequency range (f1 to f2). The steering torque Tr oscillates at a specific frequency (frequency that is not detected during normal times) when there is a power supply offset failure. The second failure detection unit 72 prestores the frequency range of the steering torque Tr, which is assumed in the event of a power supply offset failure, as the failure determination frequency range (f1 to f2), and compares the fluctuation frequency f of the steering torque Tr, calculated in step S108, with the failure determination frequency range (f1 to f2).

When the fluctuation frequency f of the steering torque Tr falls within the failure determination frequency range (f1 to f2) (f1≤f≤f2), the second failure detection unit 72 advances the process to step S103, and determines that there is a failure in the first rotation angle sensor 31. On the other hand, when there are no periodical fluctuations in steering torque Tr or the fluctuation frequency f does not fall within the failure determination frequency range (f1 to f2) even when there are periodical fluctuations in steering torque Tr, it is determined in step S110 that there is no failure in the first rotation angle sensor 31.

The second failure detection unit 72 determines a failure of the remaining one of the first rotation angle sensor 31 and the second rotation angle sensor 32 by repeating the above-described process. Therefore, it is possible to detect such a failure that cannot be detected by the use of the root-mean-square sum.

Figure 14A:
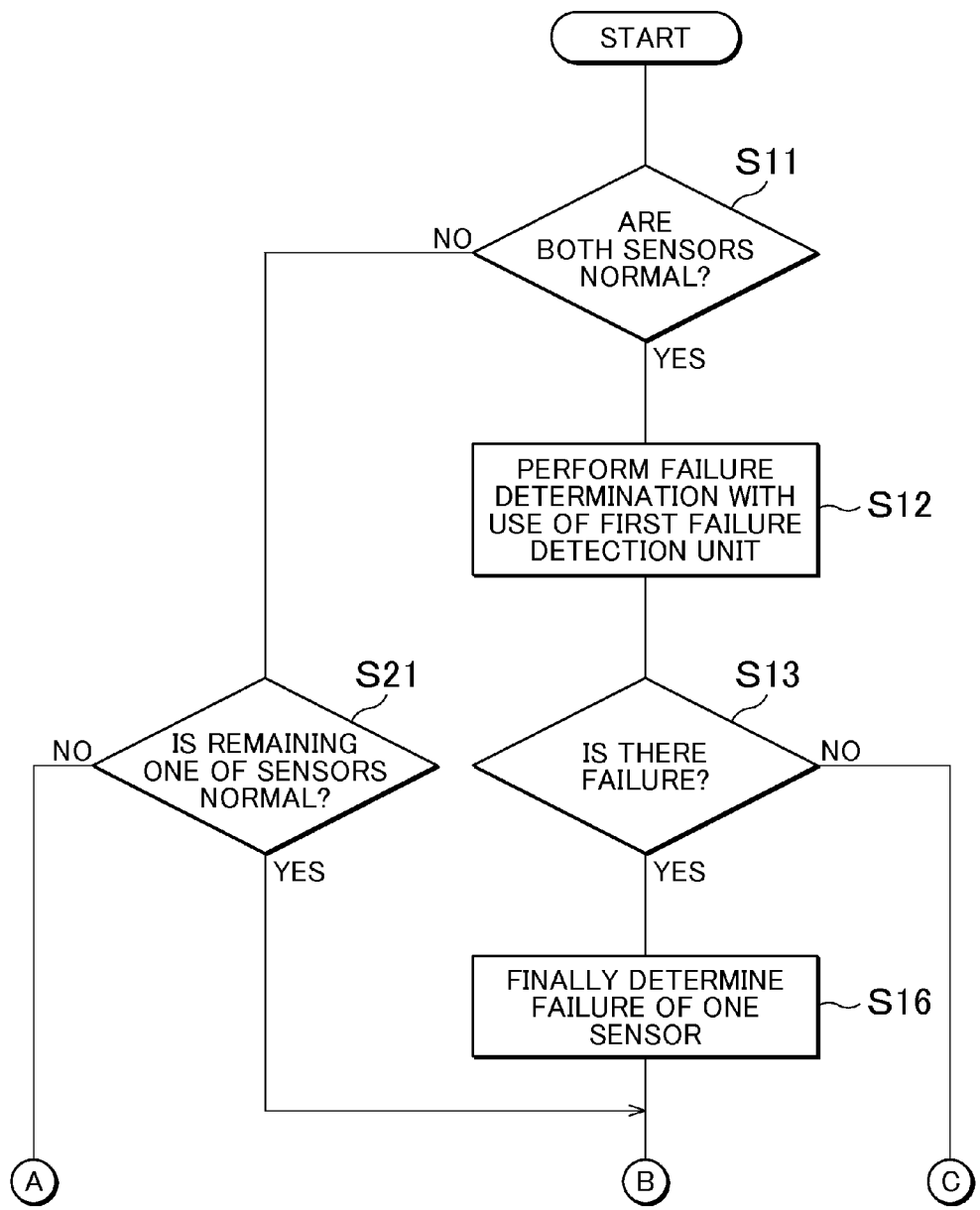
FIG. 14A and FIG. 14B are a flowchart that shows a rotation angle failure handling control routine.
Figure 14B:
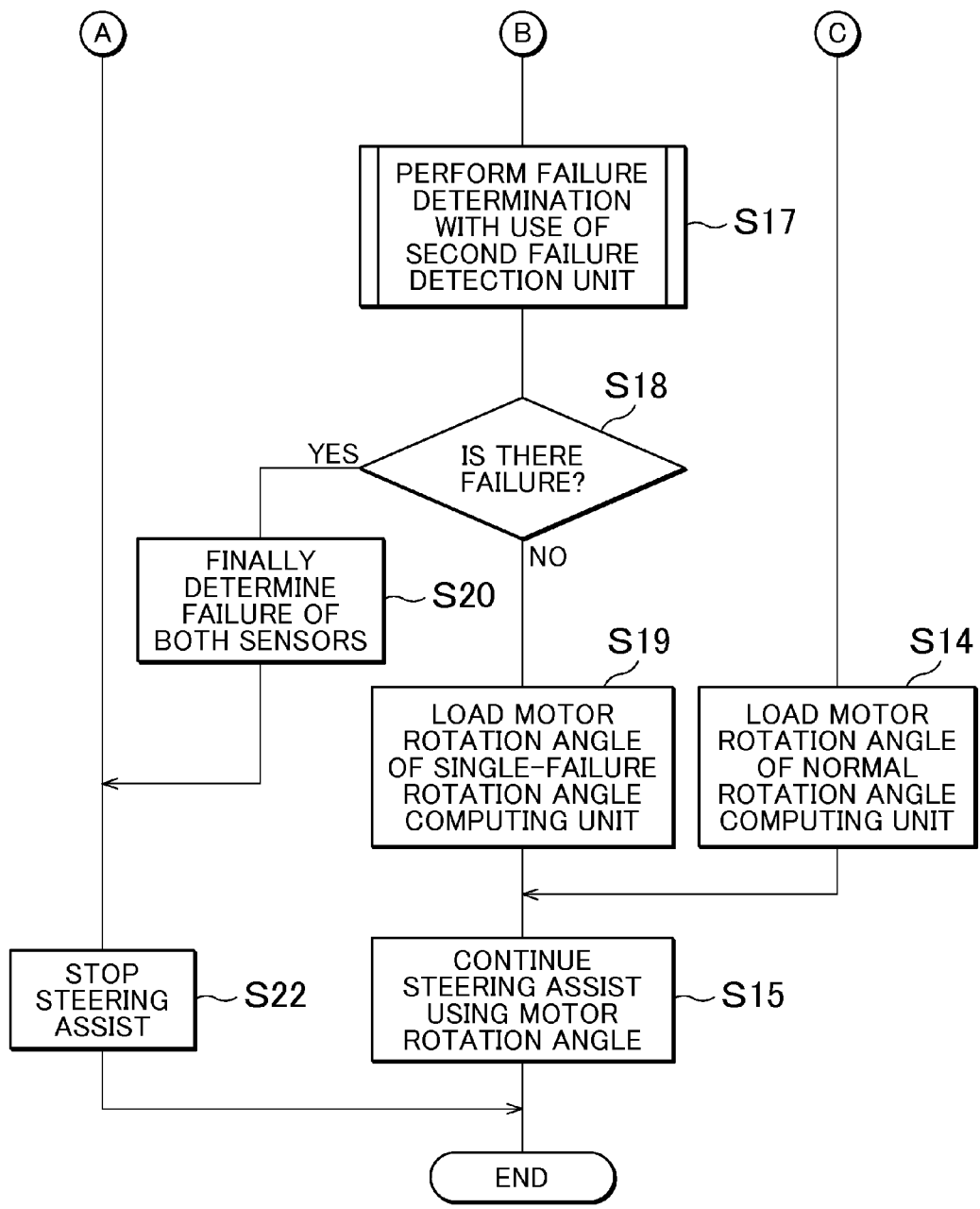

Next, the overall operations for a failure in the first rotation angle sensor 31 and the second rotation angle sensor 32 will be described. FIG. 14A and FIG. 14B show the rotation angle failure handling control routine. The routine mainly shows the overall operations that are cooperatively executed by the rotation angle sensor failure detection unit 70, the motor rotation angle computation unit 60 and the energization control unit 52, so the routine will be described below as a process that is executed by the assist computation unit 50. The assist computation unit 50 repeats the rotation angle failure handling control routine in parallel with steering assist control at predetermined short intervals during a period in which an ignition switch is in an on state.

When the routine is activated, the assist computation unit 50, in step S11, determines whether both of the first rotation angle sensor 31 and the second rotation angle sensor 32 are normal (whether no failure has been detected). When no failure has been detected in the first rotation angle sensor 31 and the second rotation angle sensor 32 (Yes in S11), the assist computation unit 50, in step S12, determines whether there is a failure in the first rotation angle sensor 31 and the second rotation angle sensor 32 with the use of the first failure detection unit 71 without using the steering torque Tr as described above.

On the other hand, when negative determination is made in step S11, the assist computation unit 50, in step S21, determines whether any one of the first rotation angle sensor 31 and the second rotation angle sensor 32 is normal (whether no failure has been detected in any one of the first rotation angle sensor 31 and the second rotation angle sensor 32). When a failure has been detected in only one of the first rotation angle sensor 31 and the second rotation angle sensor 32, the assist computation unit 50, in step S17, determines whether there is a failure in the other one of the first rotation angle sensor 31 and the second rotation angle sensor 32 with the use of the second failure detection unit 72. The process of step S17 is the same as the above-described second failure determination routine (FIG. 13).

When negative determination is made in step S21, that is, when it is determined that there is a failure in each of the first rotation angle sensor 31 and the second rotation angle sensor 32, the assist computation unit 50, in step S22, stops steering assist control.

When it is determined that there is no failure (No in S13) as a result of determining in step S12 whether there is a failure in any one of the first rotation angle sensor 31 and the second rotation angle sensor 32 with the use of the first failure detection unit 71, the assist computation unit 50 advances the process to step S14. The assist computation unit 50, in step S14, loads the motor rotation angle θ calculated by the normal rotation angle computation unit 61, and, in step S15, continues steering assist control using the motor rotation angle θ calculated by the normal rotation angle computation unit 61.

On the other hand, when it is determined that there is a failure in any one of the first rotation angle sensor 31 and the second rotation angle sensor 32 (Yes in S13), the assist computation unit 50, in step S16, finally determines that there is a failure in the any one of the first rotation angle sensor 31 and the second rotation angle sensor 32, which is identified as having a failure. That is, final failure determination information regarding any one of the first rotation angle sensor 31 and the second rotation angle sensor 32, which is identified as having a failure, is stored. Determinations of step S11 and step S21 depend on the final failure determination information. The assist computation unit 50 finally determines a failure of any one of the first rotation angle sensor 31 and the second rotation angle sensor 32 in step S16, and then advances the process to step S17.

When it is determined that there is no failure (No in S18) as a result of determining in step S17 whether there is a failure in the other one of the first rotation angle sensor 31 and the second rotation angle sensor 32 with the use of the second failure detection unit 72, the assist computation unit 50 advances the process to step S19. The assist computation unit 50, in step S19, loads the motor rotation angle θ calculated by the single-failure rotation angle computation unit 62, and, in step S15, continues steering assist control using the motor rotation angle θ calculated by the single-failure rotation angle computation unit 62. Therefore, even in the situation in which a failure of one of the first rotation angle sensor 31 and the second rotation angle sensor 32 has been detected, steering assist control using the motor rotation angle θ calculated from the detected signals of the remaining one of the first rotation angle sensor 31 and the second rotation angle sensor 32 is continued.

When it is determined that there is a failure (Yes in S18) as a result of determining in step S17 whether there is a failure in the remaining one of the first rotation angle sensor 31 and the second rotation angle sensor 32 with the use of the second failure detection unit 72, the assist computation unit 50, in step S20, stores final failure determination information for the remaining one of the first rotation angle sensor 31 and the second rotation angle sensor 32, which is identified as having a failure. Subsequently, the assist computation unit 50, in step S22, stops steering assist control.

The assist computation unit 50 repeats the rotation angle failure handling control routine at predetermined intervals. Therefore, during steering assist control, a failure determination method for the first rotation angle sensor 31 and the second rotation angle sensor 32 based on the status of a failure in the first rotation angle sensor 31 and the second rotation angle sensor 32 and any one of the first rotation angle sensor 31 and the second rotation angle sensor 32, which is used to calculate the motor rotation angle θ, is selected, and it is possible to continue steering assist control using the detected signals of the first rotation angle sensor 31 and the second rotation angle sensor 32 until there occurs a failure in each of the first rotation angle sensor 31 and the second rotation angle sensor 32.

With the electric power steering system 1 according to the above-described embodiment, the second failure detection unit 72 is provided, and, when there occurs a failure in one of the first rotation angle sensor 31 and the second rotation angle sensor 32, the failure determination method till then is changed, and failure determination based on whether there are specific fluctuations in steering torque Tr is added to determination based on the value of the root-mean-square sum. Thus, even in the case where it is not possible to detect a failure by the use of the root-mean-square sum, it is possible to increase the possibility of detecting a failure.

Fluctuations in steering torque Tr occur because of not only a failure in the first rotation angle sensor 31 and the second rotation angle sensor 32 but also another factor. In the situation in which no failure has been detected in each of the first rotation angle sensor 31 and the second rotation angle sensor 32, failure determination based on fluctuations in steering torque Tr is not performed, and, only during assist control using the motor rotation angle that is detected by the remaining one of the first rotation angle sensor 31 and the second rotation angle sensor 32, failure determination based on specific fluctuations in steering torque Tr is added. Therefore, consideration is given to fluctuations in steering torque Tr due to a factor other than a failure in the first rotation angle sensor 31 and the second rotation angle sensor 32 as much as possible in order not to erroneously determine that there is a failure in the first rotation angle sensor 31 and the second rotation angle sensor 32.

In addition, because the power supply offset failure and the signal fixation failure each generate a specific behavior of the steering torque Tr, there is a strong correlation between a failure mode of the first rotation angle sensor 31 and the second rotation angle sensor 32 and the behavior of the steering torque Tr. Therefore, failure determination is performed while setting a failure determination threshold (the failure determination value T1, the failure determination frequency range f1 to f2) on the basis of the specific behavior of the steering torque, which arises in the event of the power supply offset failure or the signal fixation failure, so it is possible to reduce the possibility of erroneous detection. That is, only when the duration of the situation in which it is determined that the steering torque |Tr| is larger than or equal to the failure determination value T1 is longer than or equal to the set time or when the fluctuation frequency f of the steering torque Tr falls within the failure determination frequency range (f1 to f2), it is determined that there is a failure, so it is possible to reduce the possibility of erroneous detection. That is, when the steering torque Tr fluctuates because of another factor, it is possible to reduce the possibility of erroneously determining that there is a failure in the first rotation angle sensor 31 and the second rotation angle sensor 32.

As a result of these, it is possible to continue accurate steering assist control by effectively utilizing the first rotation angle sensor 31 and the second rotation angle sensor 32. Thus, a driver is allowed to obtain good steering assist for an extended period of time.

Next, some alternative embodiments will be described. Initially, application of sensorless control will be described. In the above-described embodiment, in the situation in which a failure has been detected in each of the first rotation angle sensor 31 and the second rotation angle sensor 32, steering assist is stopped in step S22. Instead, steering assist may be carried out through sensorless control over the motor 20. Sensorless control over the motor 20 is a known technique for estimating the electrical angle of the motor 20 and then controlling the driving of the motor 20 on the basis of the estimated electrical angle. For example, the applicant of the present application suggests a technique for driving a motor of an electric power steering system through sensorless control in Japanese Patent Application Publication No. 2012-166776 (JP 2012-166776 A), or the like, and such a technique, or the like, may be used.

In this case, the assist computation unit 50 includes a sensorless electrical angle estimation unit 80 as indicated by the dashed line in FIG. 4. The sensorless electrical angle estimation unit 80 loads the motor currents Im that are detected by the current sensor 41 and the terminal voltages Vm that are detected by the voltage sensor 42, computes an induced voltage (counter-electromotive force) on the basis of the motor currents Im and the terminal voltages Vm, and calculates a motor angular velocity ω that is proportional to the induced voltage. The sensorless electrical angle estimation unit 80 computes a rotation angle, at which the motor 20 has rotated per one computation cycle, from the computation cycle of the induced voltages and the angular velocity, and computes a present electrical angle, that is, an estimated electrical angle θe, by adding or subtracting the rotation angle to or from an electrical angle one computation cycle before. The energization control unit 52 controls the driving of the motor 20 by using the estimated electrical angle θe.

Estimation of the electrical angle is lower in detection accuracy than actual detection of the rotation angle of the motor 20 with the use of the first rotation angle sensor 31 or the second rotation angle sensor 32. In this alternative embodiment, accurate steering assist control is continued by effectively utilizing the first rotation angle sensor 31 and the second rotation angle sensor 32, and, at the time when a failure of each of the first rotation angle sensor 31 and the second rotation angle sensor 32 has been detected, control is switched to sensorless control in step S22. Therefore, it is possible to extend steering assist as much as possible, and it is possible to reduce a burden on a driver.

Figure 15:
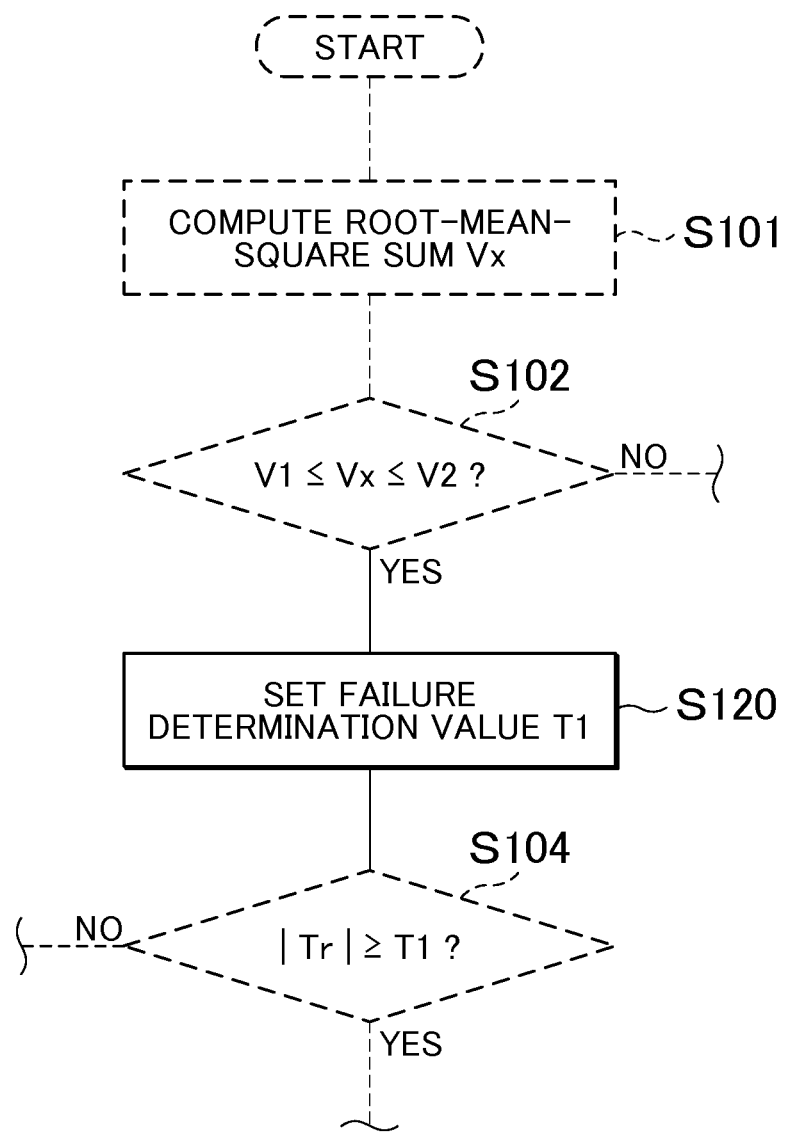
FIG. 15 is a flowchart that shows an additional process in the rotation angle failure handling control routine according to an alternative example of a failure determination threshold.

Next, an alternative embodiment of a failure determination threshold will be described. In the above-described embodiment, the second failure detection unit 72, in step S104 to step S107, determines that there is a failure in the remaining one of the first rotation angle sensor 31 and the second rotation angle sensor 32 when the duration of the situation in which the steering torque |Tr| is larger than or equal to the preset failure determination value T1 is longer than or equal to the set time. In this case, when the failure determination value T1 is small, it is easily erroneously determined that there is a failure in the remaining one of the first rotation angle sensor 31 and the second rotation angle sensor 32 even when there is actually no failure in the remaining one of the first rotation angle sensor 31 and the second rotation angle sensor 32; whereas, when the failure determination value T1 is large, the accuracy of detecting a failure in the remaining one of the first rotation angle sensor 31 and the second rotation angle sensor 32 decreases. Three alternative embodiments that improve such points will be described. The three alternative embodiments additionally include a process of setting the failure determination value T1 depending on a situation in step S120 before the second failure detection unit 72 executes the determination process of step S104 as shown in FIG. 15.

Figure 16:
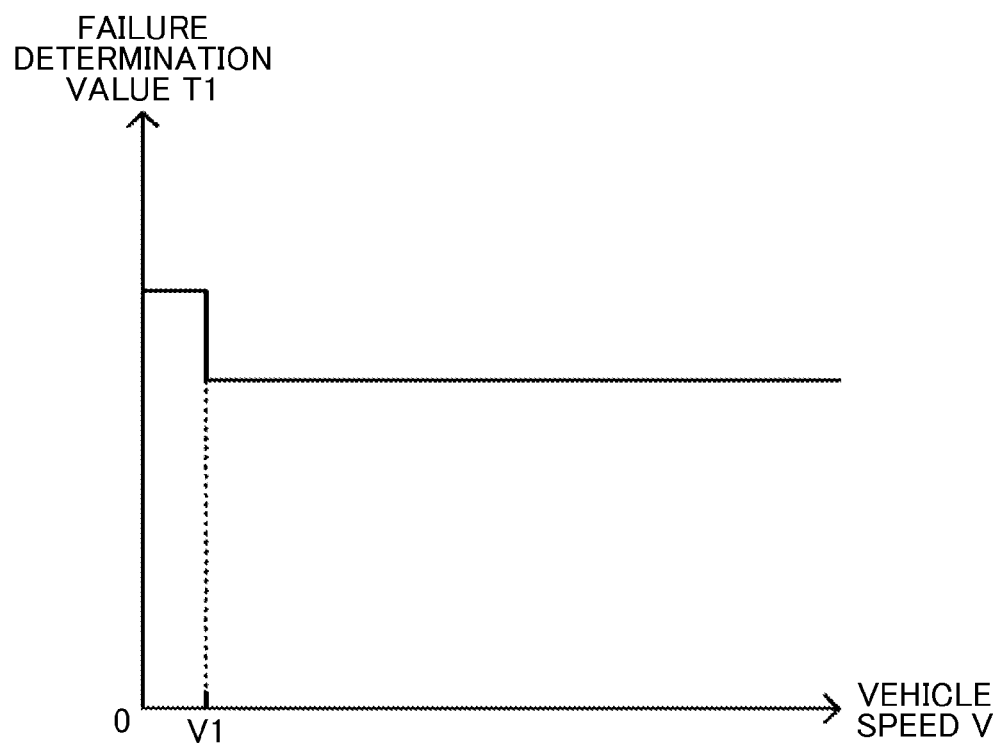
FIG. 16 is a graph that shows a failure determination value setting map.

Next, a first alternative embodiment of the failure determination threshold will be described. For example, during dry steering or during steering while traveling at an extremely low speed, an axial force is large, and a driver tends to increase an operation force that is input to the steering wheel 11. In this first alternative embodiment, the second failure detection unit 72, in step S120, loads the vehicle speed V that is detected by the vehicle speed sensor 23, and sets the failure determination value T1 in response to the vehicle speed V. For example, as shown in a failure determination value setting map in FIG. 16, the second failure detection unit 72 sets the failure determination value T1 such that the failure determination value T1 in the case where the vehicle speed V falls within the range (referred to as low vehicle speed range) of zero to a set speed V1

(extremely low speed) is larger than the failure determination value T1 in the case where the vehicle speed V does not fall within the low vehicle speed range. The second failure detection unit 72, in step S104, compares the steering torque |Tr| with this failure determination value T1. In this first alternative embodiment, the second failure detection unit 72 may be regarded as a first determination value setting unit.

In this failure determination value setting map, the failure determination value T1 is changed in two steps; however, as long as the failure determination value T1 in the case where the vehicle speed V is low is set so as to be larger than the failure determination value T1 in the case where the vehicle speed V is high, the failure determination value T1 may be changed in multiple steps or continuously. According to the first alternative embodiment, it is possible to reduce erroneous determination in failure detection while keeping the accuracy of detecting a failure in the remaining one of the first rotation angle sensor 31 and the second rotation angle sensor 32.

Next, a second alternative embodiment of the failure determination threshold will be described. Generally, an electric power steering system has the function of limiting the output of a motor. For example, when there is a possibility of overheating of the motor, the output of the motor is limited. The electric power steering system 1 according to the present embodiment also has the function of limiting the output of the motor 20. For example, when the assist computation unit 50 detects or estimates the temperature of the motor 20 and determines that there is a possibility of overheating of the motor 20, the assist computation unit 50 prevents overheating of the motor 20 by lowering the upper limit value of currents flowing through the motor 20. In such a situation in which the output of the motor 20 is limited, that is, a situation in which an output limitation mode is set, the steering assist torque is more limited than that during normal times (when the output of the motor is not limited). Therefore, the steering torque that is input to the steering wheel by a driver tends to increase.

In this second alternative embodiment, the second failure detection unit 72, in step S120, determines whether the output of the motor 20 is limited (output limitation mode), and sets the failure determination value T1 such that the failure determination value T1 in the case where the output of the motor 20 is limited is larger than the failure determination value T1 in the case where the output is not limited. Therefore, in this second alternative embodiment as well, it is possible to reduce erroneous determination in failure detection while keeping the accuracy of detecting a failure in the remaining one of the first rotation angle sensor 31 and the second rotation angle sensor 32. In this second alternative embodiment, the second failure detection unit 72 may be regarded as a second determination value setting unit.

Next, a third alternative embodiment of the failure determination threshold will be described. The steering mechanism 10 includes a stopper that sets a limit position for each of rightward and leftward steering operations. The limit position of each steering operation is called stroke end. When the steering wheel 11 is operated for steering by a large amount and then the steering position has reached one of the stroke ends, the steering wheel 11 is not allowed to be turned any more, so there is a possibility that the steering torque Tr steeply increases.

In this third alternative embodiment, the second failure detection unit 72, in step S120, loads the steering angle θh that is detected by the steering angle sensor 22, and sets the failure determination value T1 on the basis of the steering angle θh. For example, the second failure detection unit 72 determines whether the steering angle θh is close to the maximum steering angle (the steering operation position is close to one of the stroke ends), and sets the failure determination value T1 such that the failure determination value T1 in the case where the steering angle θh is close to the maximum steering angle is larger than the failure determination value T1 in the case where the steering angle θh is not close to the maximum steering angle. Therefore, in this third alternative embodiment as well, it is possible to reduce erroneous determination in failure detection while keeping the accuracy of detecting a failure in the remaining one of the first rotation angle sensor 31 and the second rotation angle sensor 32. Determination as to whether the steering angle θh is close to the maximum steering angle may be, for example, determination as to whether the steering angle θh falls within a predetermined range γ from the maximum steering angle θmax (θmax−γ≤|θh|≤θmax). In this third alternative embodiment, the second failure detection unit 72 may be regarded as a third determination value setting unit.

Next, a first alternative embodiment regarding final failure determination will be described. In the above-described embodiment, at the time when it is determined that there is a failure (at the time when it is determined that the duration of the situation in which it is determined that the steering torque |Tr| is larger than or equal to the failure determination value T1 is longer than or equal to the set time or it is determined that the fluctuation frequency f of the steering torque Tr falls within the failure determination frequency range (f1 to f2)) as a result of determining a failure in the remaining one of the first rotation angle sensor 31 and the second rotation angle sensor 32 with the use of the second failure detection unit 72, the failure is finally determined (S20). In this alternative embodiment, in finally determining a failure, the following process is further added.

Figure 17:
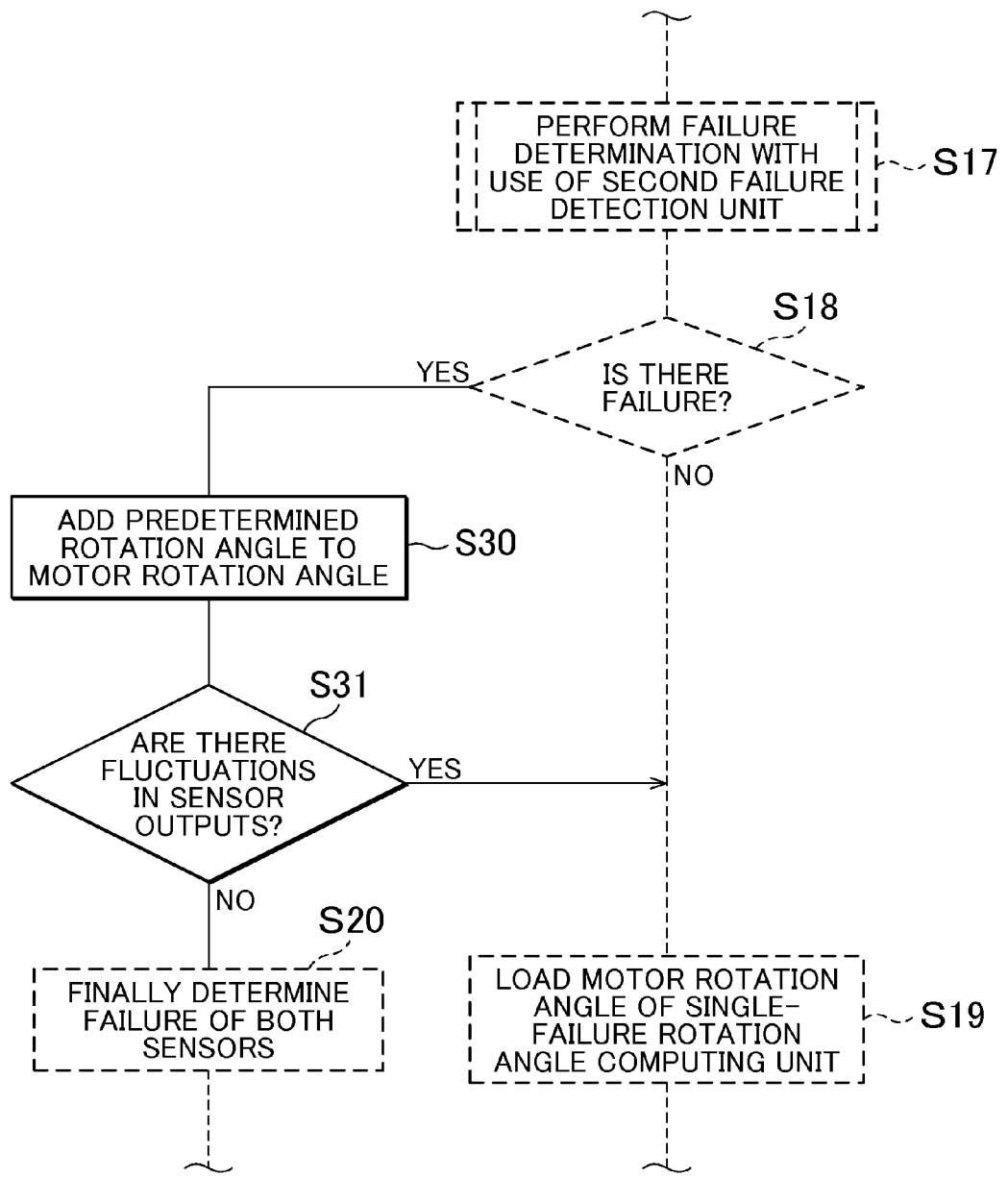
FIG. 17 is a flowchart that shows an additional process in the rotation angle failure handling control routine according to a first alternative embodiment regarding final failure determination.

FIG. 17 shows a process according to a first alternative embodiment regarding final failure determination. This first alternative embodiment adds the processes of step S30 and step S31 to the rotation angle failure handling control routine according to the embodiment. When the second failure detection unit 72 determines in step S18 of the rotation angle failure handling control routine that there is a failure, the assist computation unit 50, in step S30, adds a predetermined rotation angle to the motor rotation angle θ in the same direction as the sign of the steering torque Tr. Thus, the energization control unit 52 advances the electrical angle of the motor 20 by an amount corresponding to the added amount. Therefore, the steering assist torque that is output from the motor 20 changes, and a driver turns the steering wheel 11 in response to the change in the steering assist torque. Addition of the predetermined rotation angle is not limited to the same direction as the sign of the steering torque Tr, and may be an opposite direction.

At this time, when there is no failure in the remaining one of the first rotation angle sensor 31 and the second rotation angle sensor 32, the voltage signals that are output from the remaining one of the first rotation angle sensor 31 and the second rotation angle sensor 32 should change. The assist computation unit 50, in step S31, loads the voltage signals that are output from the remaining one of the first rotation angle sensor 31 and the second rotation angle sensor 32, and determines whether there are fluctuations in the voltage signals. When there are no fluctuations in the voltage signals, the assist computation unit 50, in step S20, finally determines a failure of the remaining one of the first rotation angle sensor 31 and the second rotation angle sensor 32. On the other hand, when there are fluctuations in the voltage signals, the assist computation unit 50 advances the process to step S19 without finally determining a failure of the remaining one of the first rotation angle sensor 31 and the second rotation angle sensor 32.

According to the first alternative embodiment regarding final failure determination, even when the second failure detection unit 72 determines that there is a failure, the failure is not immediately finally determined but the electrical angle of the motor 20 is advanced to cause a driver to turn the steering wheel 11 and then it is determined again whether there is a failure in the remaining one of the first rotation angle sensor 31 and the second rotation angle sensor 32. Therefore, it is possible to reduce erroneous determination in failure detection while keeping the accuracy of detecting a failure in the remaining one of the first rotation angle sensor 31 and the second rotation angle sensor 32.

Figure 18:
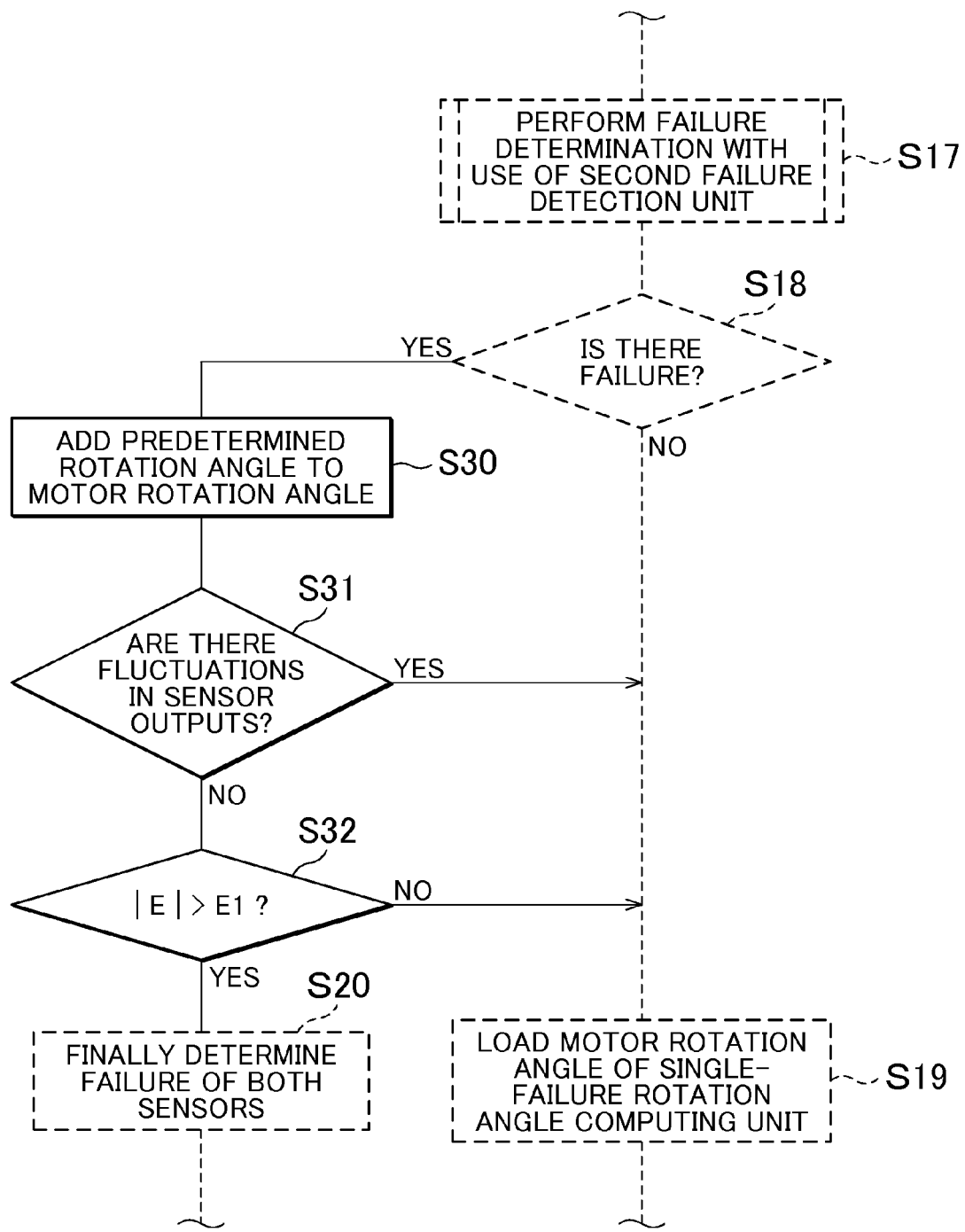
FIG. 18 is a flowchart that shows an additional process in the rotation angle failure handling control routine according to a second alternative embodiment regarding final failure determination.

Next, a second alternative embodiment regarding final failure determination will be described. For example, in the situation in which the steering wheel 11 cannot be turned (the situation in which the steering angle has reached the end position, the situation in which the steered wheels W get caught in tracks, or the like), even when the predetermined rotation angle is added to the motor rotation angle θ, there is a possibility that the voltage signals that are output from the remaining one of the first rotation angle sensor 31 and the second rotation angle sensor 32 do not change. In this second alternative embodiment regarding final failure determination, as shown in FIG. 18, a determination process of step S32 is added to the first alternative embodiment regarding final failure determination.

When the assist computation unit 50 determines in step S31 that the voltage signals that are output from the remaining one of the first rotation angle sensor 31 and the second rotation angle sensor 32 do not change, the assist computation unit 50 advances the process to step S32. The assist computation unit 50, in step S32, loads the motor currents Im that are detected by the current sensor 41 and the terminal voltages Vm that are detected by the voltage sensor 42, and computes an induced voltage (counter-electromotive force) E that is generated in the motor 20 on the basis of the motor currents Im and the terminal voltages Vm. The assist computation unit 50 determines whether the magnitude of the induced voltage E (induced voltage |E|) is larger than a wheel lock determination threshold E1.

The wheel lock determination threshold E1 is a preset threshold for determining whether the steered wheels W are locked. When the induced voltage |E| is lower than or equal to the wheel lock determination threshold E1, it may be estimated that the steered wheels W are locked, so the assist computation unit 50 makes negative determination, and advances the process to step S19. Therefore, in this case, a failure of the remaining one of the first rotation angle sensor 31 and the second rotation angle sensor 32 is not finally determined. On the other hand, when the induced voltage |E| is higher than the wheel lock determination threshold E1, it may be estimated that the steered wheels W are not locked, so the assist computation unit 50 makes affirmative determination, and advances the process to step S20. Therefore, in this case, a failure of the remaining one of the first rotation angle sensor 31 and the second rotation angle sensor 32 is finally determined.

According to the second alternative embodiment regarding final failure determination, in addition to the operation and advantageous effects of the first alternative embodiment, it is possible to reduce erroneous determination in detecting a failure of the remaining one of the first rotation angle sensor 31 and the second rotation angle sensor 32 in the situation in which the steering wheel 11 cannot be rotated.

Next, an alternative embodiment regarding an assist characteristic will be described. In the above-described embodiment, the second failure detection unit 72, in step S104 to step S107, determines that there is a failure in the remaining one of the first rotation angle sensor 31 and the second rotation angle sensor 32 when the duration of the situation in which the steering torque |Tr| is larger than or equal to the preset failure determination value T1 is longer than or equal to the set time. Thus, when there is no failure in the remaining one of the first rotation angle sensor 31 and the second rotation angle sensor 32, in which no failure has been detected, it is possible to reduce the possibility of erroneous determination by causing the steering torque |Tr| not to become larger than or equal to the failure determination value T1 as much as possible. In this alternative embodiment, the assist characteristic is switched between the case where both of the first rotation angle sensor 31 and the second rotation angle sensor 32 are normal (the case where no failure has been detected) and the case where a failure of any one of the first rotation angle sensor 31 and the second rotation angle sensor 32 has been detected.

FIG. 5A shows a normal assist characteristic. FIG. 5B shows a single-failure assist characteristic. The motor control amount computation unit 51 receives the failure detection signal "Fail" that is output from the rotation angle sensor failure detection unit 70, and determines the status of a failure in the first rotation angle sensor 31 and the second rotation angle sensor 32. When both of the first rotation angle sensor 31 and the second rotation angle sensor 32 are normal, the motor control amount computation unit 51 uses the normal assist characteristic to compute the target assist torque Ta* based on the steering torque Tr. When a failure has been detected in any one of the first rotation angle sensor 31 and the second rotation angle sensor 32, the motor control amount computation unit 51 uses the single-failure assist characteristic to compute the target assist torque Ta* based on the steering torque Tr.

In the single-failure assist characteristic, as compared to the normal assist characteristic, the degree of an increase in the target assist torque Ta* to an increase in the steering torque |Tr| is larger in the range in which the steering torque |Tr| is larger than a predetermined value, and the target assist torque Ta* for the steering torque |Tr| is set to a larger value. Therefore, in the single-failure assist characteristic, as compared to the normal assist characteristic, the target assist torque Ta* reaches the upper limit value at a smaller steering torque |Tr|. Therefore, steering operation is light.

In the single-failure assist characteristic, the failure determination value T1 that is used in determining that there is a failure in the remaining one of the first rotation angle sensor 31 and the second rotation angle sensor 32 is set to a value larger than the steering torque Tmax at which the target assist torque Ta* reaches an upper limit value Ta*max. By setting in this way, a driver usually operates the steering wheel 11 with a steering torque in the range in which the target assist torque Ta* is smaller than or equal to the upper limit value Ta*max. Therefore, when steering assist control is executed by the use of the single-failure assist characteristic, the steering torque |Tr| is smaller than the failure determination value T1.

According to the alternative embodiment regarding an assist characteristic, it is possible to reduce erroneous determination in failure detection while keeping the accuracy of detecting a failure in the remaining one of the first rotation angle sensor 31 and the second rotation angle sensor 32.

The electric power steering system 1 for a vehicle according to the present embodiment and the alternative embodiments are described above; however, the invention is not limited to the above-described embodiment and alternative embodiments. The invention may be variously modified without departing from the purpose of the invention.

For example, in the present embodiment, the rotation angle detection unit that detects the motor rotation angle θ on the basis of the output signals of the MR sensors is provided; however, the rotation angle detection unit does not necessarily include MR sensors, and may use another sensor.

A combination of the embodiment with the first, second or third alternative embodiment of the failure determination threshold as needed may be implemented. That is, the failure determination value T1 may be set by using an OR condition that is any combination of a vehicle speed condition, an output limitation mode condition and a steering angle condition.

The first or second alternative embodiment regarding final failure determination may also be combined with not only the embodiment but also the first, second or third alternative embodiment of the failure determination threshold as needed. The alternative embodiment regarding an assist characteristic may also be combined with not only the embodiment but also the first, second or third alternative embodiment of the failure determination threshold or the first or second alternative embodiment regarding final failure determination as needed.

In the present embodiment, the rotation angle detection unit (rotation angle sensor unit 30) directly detects the rotation angle of the rotor of the motor 20. Instead, the rotation angle detection unit may be configured to detect the rotation angle of a member that rotates together with rotation of the motor 20, such as the pinion shaft 12c and the intermediate shaft 12b.

In the present embodiment, a column assist-type electric power steering system that applies torque, which is generated by the motor 20, to the steering shaft 12 is described; however, a rack assist-type electric power steering system that applies torque, which is generated by a motor, to the rack bar 14 is also applicable.

What is claimed is:

1. An electric power steering system for a vehicle, comprising:
    a torque detection unit configured to detect a steering torque input from a steering wheel to a steering shaft;
    a motor provided in a steering mechanism, the motor being configured to generate a steering assist torque;
    a rotation angle detection unit including a first rotation angle sensor and a second rotation angle sensor, the rotation angle detection unit being configured to detect a rotation angle of the motor with an output signal of at least one of the first rotation angle sensor and the second rotation angle sensor;
    a motor control value computing unit configured to compute a motor control value for generating a target steering assist torque based on the steering torque detected by the torque detection unit;
    a motor control unit configured to control driving of the motor based on the rotation angle detected by the rotation angle detection unit and the motor control value computed by the motor control value computing unit; and
    a sensor failure determination unit configured to determine whether there is a failure in the first rotation angle sensor and the second rotation angle sensor by one of mutually different failure determination methods depending on whether a situation is a first situation or a second situation, the first situation being a situation in which a failure of one of the first rotation angle sensor and the second rotation angle sensor has been already detected, the second situation being a situation in which neither a failure of the first rotation angle sensor nor a failure of the second rotation angle sensor has been detected, wherein
    the motor control unit is configured to, in the first situation, continue to control driving of the motor based on the rotation angle detected by a remaining rotation angle sensor in which no failure has been detected, the remaining rotation angle sensor being the first rotation angle sensor or the second rotation angle sensor, and
    the sensor failure determination unit is configured to, only when determining, in the first situation, whether there is a failure in the remaining rotation angle sensor, determine whether there is a failure based on whether the steering torque detected by the torque detection unit exhibits a specific behavior assumed to be detected when there is a failure in the remaining rotation angle sensor.

2. The electric power steering system according to claim 1, wherein
    the specific behavior includes a behavior that a duration of a state where the steering torque is larger than or equal to a preset failure determination value is longer than or equal to a set time.

3. The electric power steering system according to claim 2, further comprising
    a first determination value setting unit configured to set the failure determination value larger when a speed of the vehicle is relatively low than when the speed of the vehicle is relatively high.

4. The electric power steering system according to claim 2, further comprising
    a second determination value setting unit configured to set the failure determination value larger when the motor control unit is operating in an output limitation mode in which an output of the motor is limited than when the motor control unit is not operating in the output limitation mode.

5. The electric power steering system according to claim 2, further comprising
    a third determination value setting unit configured to set the failure determination value larger when the steering wheel is located within a predetermined range from a steering limit position than when the steering wheel is not located within the predetermined range from the steering limit position.

6. The electric power steering system according to claim 2, wherein
    the sensor failure determination unit is configured to, when the behavior that the duration is longer than or equal to the set time has been detected, add a predetermined rotation angle to a motor rotation angle used by the motor control unit to control driving of the motor, and
    the sensor failure determination unit is configured to determine that there is a failure in the remaining rotation angle sensor when there occurs no change in the rotation angle detected by the rotation angle detection unit after adding the predetermined rotation angle to the motor rotation angle.

7. The electric power steering system according to claim 6, wherein
    the sensor failure determination unit is configured to determine that there is a failure in the remaining rotation angle sensor when there occurs no change in the rotation angle detected by the rotation angle detection unit after adding the predetermined rotation angle to the motor rotation angle and when a magnitude of an induced voltage generated in the motor is higher than a set voltage for determining that the motor is rotating.

8. The electric power steering system according to claim 1, wherein
the motor control value computing unit is configured to set a magnitude of the target steering assist torque for the steering torque larger when a failure of one of the first rotation angle sensor and the second rotation angle sensor has been detected by the sensor failure determination unit than when neither a failure of the first rotation angle sensor nor a failure of the second rotation angle sensor has been detected.

9. The electric power steering system according to claim 1, wherein
each of the first rotation angle sensor and the second rotation angle sensor includes two magnetic sensors,
each of the two magnetic sensors includes two serially connected magnetoresistance elements to which voltage is applied from a power supply circuit,
each of the two magnetic sensors is configured to output a voltage signal at a connection point of the corresponding two magnetoresistance elements, the voltage signals changing in a sinusoidal shape with rotation of the motor and having equal amplitudes with phases shifted by $\pi/2$ from each other, and
the specific behavior includes a behavior that the steering torque periodically changes in a preset frequency range.

* * * * *